United States Patent
Smith, IV et al.

(10) Patent No.: US 11,126,853 B2
(45) Date of Patent: Sep. 21, 2021

(54) VIDEO TO DATA

(71) Applicant: CELLULAR SOUTH, INC., Ridgeland, MS (US)

(72) Inventors: Bartlett Wade Smith, IV, Madison, MS (US); Allison A. Talley, Ridgeland, MS (US); John Carlos Shields, Fort Worth, TX (US)

(73) Assignee: CELLULAR SOUTH, INC., Ridgeland, MS (US)

( * ) Notice: Subject to any disclaimer, the term of this patent is extended or adjusted under 35 U.S.C. 154(b) by 86 days.

(21) Appl. No.: 16/271,773

(22) Filed: Feb. 8, 2019

(65) Prior Publication Data
US 2019/0340437 A1    Nov. 7, 2019

Related U.S. Application Data

(63) Continuation of application No. 15/197,727, filed on Jun. 29, 2016, now Pat. No. 10,204,274.

(51) Int. Cl.
| | |
|---|---|
| *G06K 9/00* | (2006.01) |
| *G06K 9/62* | (2006.01) |
| *G06F 40/40* | (2020.01) |
| *G10L 15/26* | (2006.01) |
| *G06K 9/66* | (2006.01) |
| *H04N 21/2343* | (2011.01) |
| *H04N 21/236* | (2011.01) |
| *H04N 21/845* | (2011.01) |

(52) U.S. Cl.
CPC ......... *G06K 9/00718* (2013.01); *G06F 40/40* (2020.01); *G06K 9/00201* (2013.01); *G06K 9/00261* (2013.01); *G06K 9/6256* (2013.01); *G06K 9/66* (2013.01); *G10L 15/26* (2013.01); *H04N 21/23439* (2013.01); *H04N 21/23608* (2013.01); *H04N 21/8456* (2013.01); *G06K 2209/25* (2013.01); *G06K 2209/27* (2013.01)

(58) Field of Classification Search
None
See application file for complete search history.

(56) References Cited

U.S. PATENT DOCUMENTS

| | | | | |
|---|---|---|---|---|
| 2006/0187305 A1* | 8/2006 | Trivedi | ............. | G06K 9/00241 348/169 |
| 2010/0189313 A1* | 7/2010 | Prokoski | ................ | A61B 5/411 382/118 |
| 2011/0305394 A1* | 12/2011 | Singer | ..................... | G06K 9/46 382/190 |
| 2015/0050010 A1* | 2/2015 | Lakhani | .................. | G10L 25/57 386/285 |

\* cited by examiner

*Primary Examiner* — Delomia L Gilliard
(74) *Attorney, Agent, or Firm* — Steptoe & Johnson LLP

(57) ABSTRACT

A method and system can generate video content from a video. The method and system can include a coordinator, an image detector, and an object recognizer. The coordinator can be communicatively coupled to a splitter and/or to a plurality of demultiplexer nodes. The splitter can be configured to segment the video. The demultiplexer nodes can be configured to extract audio files from the video and/or to extract still frame images from the video. The image detector can be configured to detect images of objects in the still frame images. The object recognizer can be configured to compare an image of an object to a fractal. The recognizer can be further configured to update the fractal with the image. The coordinator can be configured to embed metadata about the object into the video.

11 Claims, 17 Drawing Sheets

VIDEO TO DATA

CLAIM OF PRIORITY

This application is a continuation of U.S. application Ser. No. 15/197,727, filed Jun. 29, 2016, now U.S. Pat. No. 10,204,274, which is incorporated by reference in its entirety.

TECHNICAL FIELD

The present invention relates to a method and a system for generating various and useful data from source media, such as videos and other digital content. The data can be embedded within the source media or combined with the source media for creating an augmented video containing additional contextual information.

BACKGROUND

In the field of image contextualization, distributed reverse image similarity searching can be used to identify images similar to a target image. Reverse image searching can find exactly matching images as well as flipped, cropped, and altered versions of the target image. Distributed reverse image similarity searching can be used to identify symbolic similarity within images. Audio-to-text algorithms can be used to transcribe text from audio. An exemplary application is note-taking software. Audio-to-text, however, lacks semantic and contextual language understanding.

SUMMARY

The present invention is generally directed to a method to generate data from video content, such as text and/or image-related information. A server executing the method can be directed by a program stored on a non-transitory computer-readable medium. The video text can be, for example, a context description of the video.

An aspect can include a system for generating data from a video. The system can include a coordinator, an image detector, and an object recognizer. The coordinator can be communicatively coupled to a splitter and/or to a plurality of demultiplexer nodes. The splitter can be configured to segment the video. The demultiplexer nodes can be configured to extract audio files from the video and/or to extract still frame images from the video. The image detector can be configured to detect images of objects in the still frame images. The object recognizer can be configured to compare an image of an object to a fractal. The recognizer can be further configured to update the fractal with the image. The coordinator can be configured to embed metadata about the object into the video.

In some embodiments, the metadata can include a timestamp and/or a coordinate location of the object in one or more of the still frame images. The coordinator can be configured to create additional demultiplexer processing capacity. The coordinator can be configured to create additional demultiplexer nodes, e.g., when the demultiplexer nodes reach at least 80% of processing capacity.

In other embodiments, the demultiplexer nodes can generate a confidence score based on a comparison of the image and the fractal. In yet other embodiments, the recognizer can generate a confidence score based on a comparison of the image and the fractal.

Another aspect can include a method to generate data from a video. The method can include segmenting the video into video segments, extracting an audio file from a segment of the video segments, extracting a video frame file of still frames from the segment, detecting an image of an object in the still frames, recognizing the object as a specific object, updating an object-specific fractal with the image, and embedding metadata in the video about the specific object.

In some embodiments, the metadata can include a timestamp and/or a coordinate location of the object in one or more of the still frames. The metadata can include a recognition confidence score. The method can further include distributing the video segments across a plurality of processors. The method can include extracting a plurality of video frame files, such as all of the video segments, by a plurality of parallel processors.

In other embodiments, the video can be a stereoscopic three-dimensional video.

In yet other embodiments, the method can include generating text based on extracted audio file and/or applying natural language processing to the text. The method can include determining context associated with the video based on the natural language processing.

In some embodiments, the method can include processing the video frame file to extract image text. The object can be a face or a logo. The object can be recognized as a three-dimensional rotation of a known object.

In other embodiments, a three-dimensional fractal can be updated, e.g., with the image of the object. The method can include generating a content-rich video based on the video and the metadata.

Another aspect can include a system for generating data from a video. The system can include a coordinator, an image detector, and an object recognizer. The coordinator can be communicatively coupled to a splitter and/or to a plurality of demultiplexer nodes. The splitter can be configured to segment the video. The demultiplexer nodes can be configured to extract audio files from the video and/or to extract still frame images from the video. The image detector can be configured to detect images of objects in the still frame images. The object recognizer can be configured to compare an object image of an object to a fractal. The recognizer can be further configured to update the fractal with the object image. The coordinator can be configured to generate one or more metadata streams corresponding to the images. The one or more metadata streams can include timestamps corresponding to the images. The coordinator can be configured to embed the metadata streams in the video.

In some embodiments, the metadata streams can be embedded in the video as subtitle resource tracks.

In other embodiments, the system can be accessible over a network via application program interfaces (APIs).

In yet other embodiments, the coordinator can be further configured to output the video according to multiple video formats. For example, the coordinator can be configured to automatically generate data files in a variety of formats for delivery independent of the video. The system in some embodiments can embed data as a stream, as a wrapper, and/or as a subtitle resource track. The coordinator can be configured to read/write to/from Media Asset Management Systems, Digital Asset Management Systems, and/or Content Management Systems.

In some embodiments, the system can be configured to capture the geolocation of objects in a video. The system can be configured to derive a confidence score for each instance of recognition. The system can be configured to apply natural language processing, for example, for associative terms and/or to apply contextual analysis of corresponding data points (such as audio, objects, etc.) to verify accuracy.

An aspect can include a method of creating data from a video by machine recognition. The method can include extracting an audio file from the video, segmenting the video into video frames of still images, distributing the video segments to N processors, wherein N is an integer greater than one, generating a timestamped transcript from the audio file, associating the timestamped transcript with corresponding video frames, deriving topics from the audio file based on natural language processing, recognizing an object from still images, using a reference database to identify the object, and embedding, within the video, data based on a recognized object, the topics, and the timestamped transcript.

In some embodiments, the video can be a virtual reality video file or a traditional video vile. Data based on the recognized object can include a geolocation.

In other embodiments, the method can include generating a plurality of video files. Each of the video files can include the video and the embedded data. Each of the plurality of video files can be generated in a different format.

In other embodiments, the method can include generating a confidence score. The score can be associated with the recognized object. The method can include analyzing the still images to determine context of the video.

DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 12 illustrates exemplary distributed processing and aggregation.

DETAILED DESCRIPTION

Figure 1:
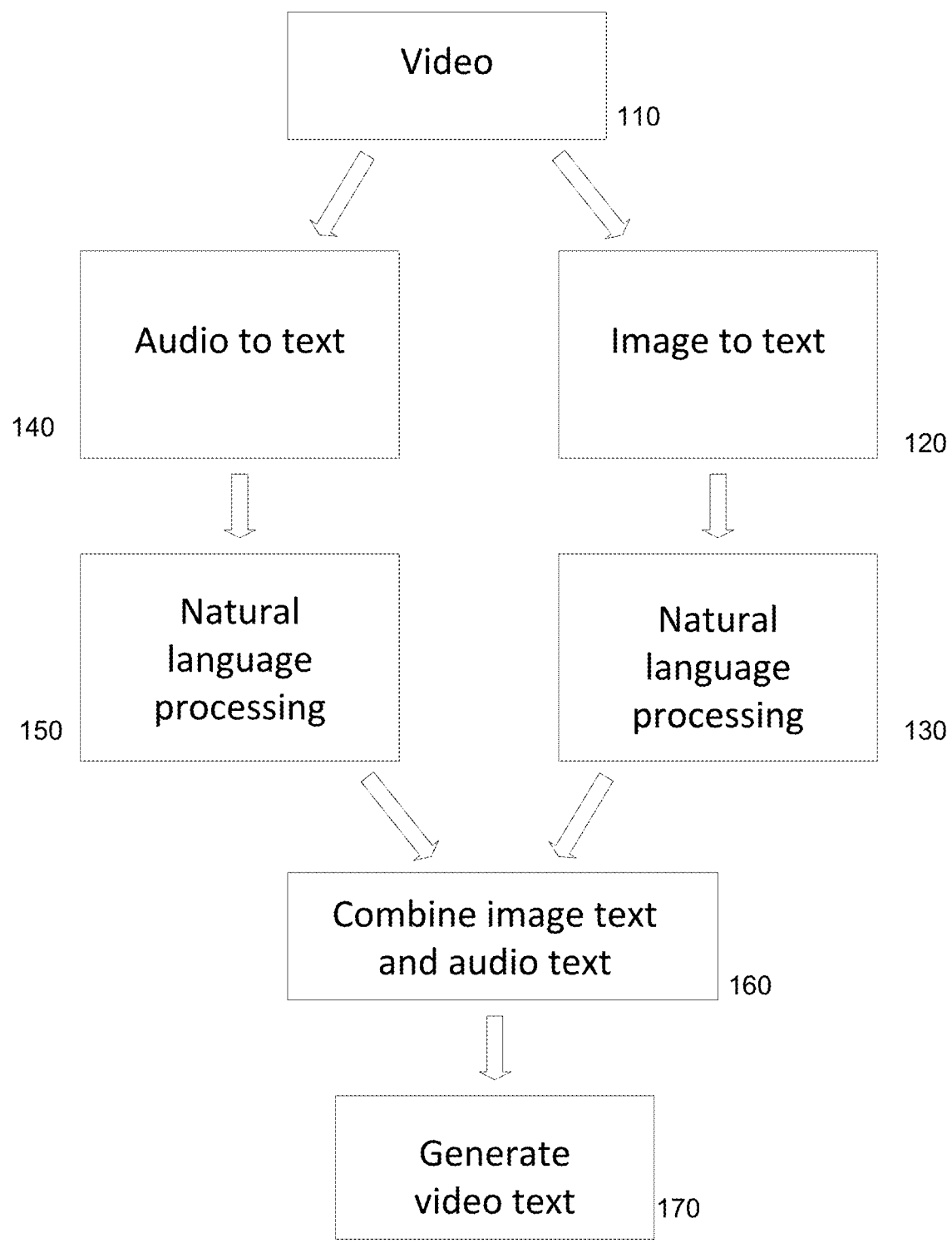
FIG. 1 illustrates an exemplary workflow in certain embodiments.

A detailed explanation of the system and method according to exemplary embodiments of the present invention are described below. Exemplary embodiments described, shown, and/or disclosed herein are not intended to limit the claims, but rather, are intended to instruct one of ordinary skill in the art as to various aspects of the invention. Other embodiments can be practiced and/or implemented without departing from the scope and spirit of the claimed invention.

The present invention is generally directed to system, device, and method of generating data from source media, such as images, video, and audio. Video can include two-dimensional video and/or stereoscopic three-dimensional video such as virtual reality (VR) files. The generated data can include text and information relating to context, symbols, brands, features, objects, faces and/or topics found in the source media. In an embodiment, the video-to-data engine can perform the functions directed by programs stored in a computer-readable medium. That is, the embodiments can include hardware (such as circuits, processors, memory, user and/or hardware interfaces, etc.) and/or software (such as computer-program products that include computer-useable instructions embodied on one or more computer-readable media).

The various video-to-data techniques, methods, and systems described herein can be implemented in part or in whole using computer-based systems and methods. Additionally, computer-based systems and methods can be used to augment or enhance the functionality described herein, increase the speed at which the functions can be performed, and provide additional features and aspects as a part of, or in addition to, those described elsewhere herein.

Various computer-based systems, methods, and implementations in accordance with the described technology are presented below.

A video-to-data engine can be embodied by a computer or a server and can have an internal or external memory for storing data and programs such as an operating system (e.g., DOS, Windows2000™, Windows XP™, Windows NT™, OS/2, UNIX, Linux, Xbox OS, Orbis OS, and FreeBSD) and/or one or more application programs. The video-to-data engine can be implemented by a computer or a server through tools of a particular software development kit (SDK). Examples of application programs include computer programs implementing the techniques described herein for lyric and multimedia customization, authoring applications (e.g., word processing programs, database programs, spreadsheet programs, or graphics programs) capable of generating documents, files, or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP). One or more of the application programs can be installed on the internal or external storage of the computer. Application programs can be externally stored in or performed by one or more device(s) external to the computer.

The computer or server can include a central processing unit (CPU) for executing instructions in response to commands, and a communication device for sending and receiving data. One example of the communication device can be a modem. Other examples include a transceiver, a communication card, a satellite dish, an antenna, a network adapter, or some other mechanism capable of transmitting and receiving data over a communications link through a wired or wireless data pathway.

The computer or server can also include an input/output interface that enables wired or wireless connection to various peripheral devices. In one implementation, a processor-based system of the computer can include a main memory, preferably random access memory (RAM), and can also include a secondary memory, which can be a tangible computer-readable medium. The tangible computer-readable medium memory can include, for example, a hard disk drive or a removable storage drive, a flash based storage system or solid-state drive, a floppy disk drive, a magnetic tape drive, an optical disk drive (Blu-Ray, DVD, CD drive), magnetic tape, paper tape, punched cards, standalone RAM disks, Iomega Zip drive, etc. The removable storage drive can read from or write to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the tangible computer-readable medium memory can include other similar means for allowing computer programs or other instructions to be loaded into a computer system. Such means can include, for example, a removable storage unit and an interface. Examples of such can include a program cartridge and cartridge interface (such as found in video game devices), a removable memory chip (such as an EPROM or flash memory) and associated socket, and other removable storage units and interfaces, which allow software and data to be transferred from the removable storage unit to the computer system.

An embodiment of video-to-data engine operation is illustrated in FIG. 1. At 110, a video stream is presented. The video stream can be in one or more of the formats (but not limited to): Advanced Video Codec High Definition (AVCHD), Audio Video Interlaced (AVI), Flash Video Format (FLV), Motion Picture Experts Group (MPEG), Windows Media Video (WMV), or Apple QuickTime (MOV), h.264 (MP4).

The engine can extract audio data and image data (e.g. images or frames forming the video) from the video stream. The engine can detect and identify objects, faces, logos, text, music, sounds and spoken language in video by means of demultiplexing and extracting features from the video and passing those features into a distributed system as the video loads into the network I/O buffer. In some embodiments, the video stream and the extracted image data can be stored in a memory or storage device such as those discussed above. A copy of the extracted image data can be used for processing.

The system and method can include dialog extraction. Language and vocabulary models can be included in the system to support desired languages. Multiple languages can be incorporated into the system and method. The engine can process audio media containing multiple audio tracks as separate tracks or as a single track. Text extraction can be optimized by utilizing audio segments of various lengths in time. For example, if a segment of audio is greater than one minute, the engine can split the audio track in half. In this case, the engine can first analyze that specific sequence for dialog at the timestamp of the potential split. If the segment at the split contains audio, the system can split the audio at the next silent point in the track to avoid splitting tracks mid-word. Each segment is processed using the Kaldi process for speech recognition and dialog extraction. Segments can be subsequently processed through, for example, LIUM speaker diarization. Results can be applied to a result datastore for analysis or later processing.

Figure 3:
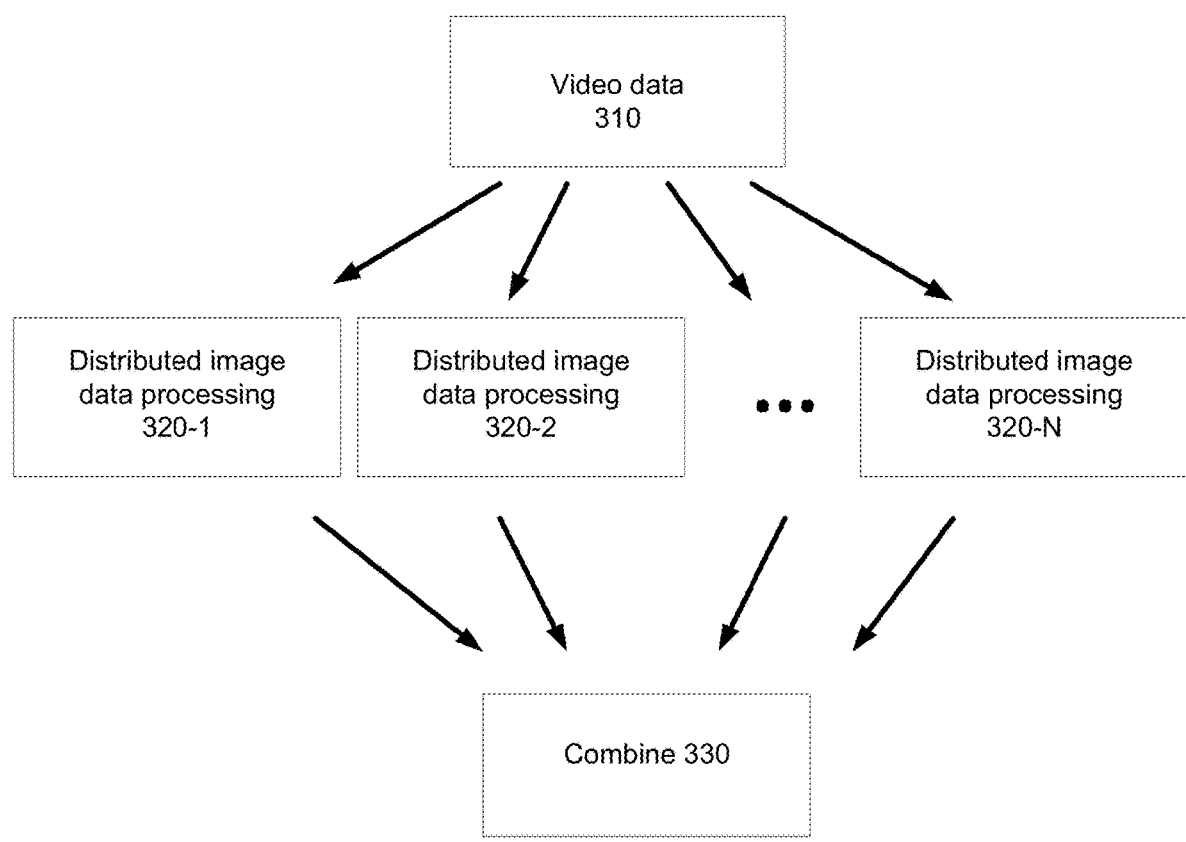
FIG. 3 illustrates aspects of image data processing.

An example of the image data processing is illustrated in FIG. 3. The video-to-data engine can segment the video into chunks for distributed, or parallel, processing as shown schematically in FIG. 3. Distributed processing in this context can mean that the processing time for analyzing a video from beginning to end is a fraction of the play time of the video. This can be accomplished by breaking the processes into sections and processing them simultaneously. The images and audio can each be broken up into pieces such that the meaning of a continuous message is preserved. At 120, the video-to-data engine performs an image data processing on the video stream. In FIG. 3, the image data 310 can be segmented into N segments and processed in parallel (e.g., distributed processing 320-1 to 320-N), allowing for near real-time processing.

An example of the video image data processing can be symbol (or object) based. Using an image processing technique such as color edge detection, a symbol of a screen or an image of the video can be isolated. The symbol can be identified using an object template database. For example, the symbol includes 4 legs and a tail, and when matched with the object template database, the symbol may be identified as a dog. The object template database can be adaptive and therefore, the performance would improve with usage.

Other image data processing techniques can include image extraction, high-level vision and symbol detection, figure-ground separation, depth and motion perception. These and/or other image data processing techniques can be utilized to build a catalogue and/or repository of extracted objects. Recognized information about the extracted objects—such as object type, context, brands/logos, vehicle type/make/model, clothing worn, celebrity name, etc.—can be added to a file associated with the extracted object and/or used to augment metadata in the video from which the image data was processed.

Another example of video image processing can be color segmentation. The colors of an image (e.g., a screen) of the video can be segmented or grouped. The result can be compared to a database using color similarity matching.

Based on the identified symbol, a plurality of instances of the symbol can be compared to a topic database to identify a topic (such as an event). For example, the result may identify the dog (symbol) as running or jumping. The topic database can be adaptive to improve its performance with usage.

Figure 9:
FIG. 9 illustrates an embodiment of a graphical user interface of the present invention.

Thus, using the processing example above, text describing a symbol of the video and topic relating to the symbol can be generated, as is illustrated in FIG. 9. Data generated from an image and/or from audio transcription can be time stamped, for example, according to when it appeared, was heard, and/or according to the video frame from which it was pulled. The time-stamped data can be physically associated with the video as metadata embedded at the relevant portion of video.

At 330, the engine combines the topics as an array of keys and values with respect to the segments. The engine can segment the topics over a period of time and weight the strength of each topic. Further, the engine applies the topical metadata to the original full video. The image topics can be stored as topics for the entire video or each image segment. The topic generation process can be repeated for all identifiable symbols in a video in a distributed process. The outcome would be several topical descriptors of the content within a video. An example of the aggregate information that can be derived using the above example would be a determination that the video presented a dog, which was jumping, on the beach, with people, by a resort.

Although further described herein, image detection can be considered a process of determining if a pattern or patterns exist in an image and whether the pattern or patterns meet criteria of a face, image, and/or text. If the result is positive, image recognition can be employed. Image recognition can generally be considered matching of detected objection to known objects and/or matching through machine learning. Generally speaking, detection and recognition, while sharing various aspects, are distinct.

Identifying various objects in an image can be a difficult task. For example, locating or segmenting and positively identifying an object in a given frame or image can yield false positives—locating but wrongfully identifying an object. Therefore, present embodiments can be utilized to eliminate or reduce false positives, for example, by using context. As one example, if the audio soundtrack of a video is an announcer calling a football game, then identification of ball in a given frame as a basketball can be assigned a reduced probability or weighting. As another example of using context, if a given series of image frames from a video is positively or strongly identified as a horse race, then identifying an object to be a mule or donkey can be given a reduced weight.

Using the context or arrangement of certain objects in a given still or static image to aid in computer visual recognition accuracy can be an extremely difficult task given certain challenges associated with partially visible or self-occluded objects, lack of objects, and/or faces, and/or words or an overly cluttered image, etc. However, the linear sequencing of frames from a video—as opposed to a stand-alone image—avails itself to a set images {images x-y} from which context can be derived. This contextual methodology can be viewed as systematic detection of probable image false positives by identifying an object from one video frame (or image) as an anomaly when compared to and associated with a series of image frames both prior and subsequent to the purported anomaly. According to the objects, faces, words, etc. of a given set of frames (however defined), a probability can be associated with an identified anomaly to determine whether an image is a false positive and, if so, what other likely results can be.

In certain instances, identification of an individual can be a difficult task. For example, facial recognition can become difficult when an individual's face is obstructed by another object like a football, a baseball helmet, a musical instrument, or other obstructions. An advantage of some embodiments described herein can include the ability to identify an individual without identification of the individual's face. Embodiments can use contextual information such as associations of objects, text, and/or other context within an image or video. As one example, a football player scores a touchdown but rather than identifying the player using facial recognition, the player can be identified by object recognition of, for example, the player's team's logo, text recognition of the player's jersey number, and by cross referencing this data with that team's roster (as opposed to another team, which is an example of why the logo recognition can be important). Such embodiments can further learn to identify that player more readily and save his image as data.

Similarly, the audio transcript of a video can be used to derive certain context helpful in identifying and correcting or eliminating image false positives. In this way, an image anomaly or anomalies identified in a given video frame(s) are associated with time (time stamped) and correlated with a time range from the transcribed audio to establish certain probabilities of accuracy.

Moreover, the aforementioned methodologies—establishing probabilities of accuracy of image identification from a set of frames and from the audio transcription—can be combined to improve the results. Improved results can be embedded in a video—or an audio file and/or an image file—as metadata, as can probabilities of accuracy.

In some embodiments, a similar context methodology can be used to identify unknown objects in a given image by narrowing a large, or practically infinite, number of possibilities to a relatively small number of object possibilities and assigning probabilities. For example, neuro-linguistic programming (NLP), neural network programming, or deep neural networks can be utilized to achieve sufficient narrowing and weighting. For further example, based on a contextual review of a large number of objects over a period of time, a series of nodes in parallel and/or in series can be developed by the processor. Upon initial recognition of objects and context, these nodes can assign probabilities to the initial identification of the objection with each node in turn using context and further description to narrow the probabilistic choices of an object. Other methodologies can be utilized to determine and/or utilize context as described herein.

Natural language processing can be useful in creating an intuitive and/or user-friendly computer-human interaction. In some embodiments, the system can select semantics or topics, following certain rules, from a plurality of possible semantics or topics, can give them weight based on strength of context, and/or can do this in a distributed environment. The natural language processing can be augmented and/or improved by implementing machine-learning. A large training set of data can be obtained from proprietary or publicly available resources. For example, CBS News maintains a database of segments and episodes of "60-Minutes" with full transcripts, which can be useful for building a training set and for unattended verification of audio segmentation. The machine learning can include ensemble learning based on the concatenation of several classifiers, i.e. cascade classifiers.

At 130, an optional step of natural language processing can be applied to the image text. For example, based on dictionary, grammar, and a knowledge database, the text extracted from video images can be modified as the video-to-data engine selects primary semantics from a plurality of possible semantics. In some embodiments, the system and method can incorporate a Fourier transform of the audio signal. Such filtering can improve silence recognition, which can be useful for determining proper placement of commas and periods in the text file. In some embodiments, a text extraction step can include analyzing each image using optical character recognition (OCR) to identify possible text matches and the location of the text within the image; character sequences can be identified for each possible text match, and for sequences with the same spatial separation, an entry can be created in a result set for that sequence of characters or words. In parallel, at 140, the video-to-data engine can perform audio-to-text processing on audio data associated with the video. For example, for a movie video, the associated audio can be the dialog or even background music.

In addition to filtering of the audio signal, images from the video signal can be processed to address, for example, the problem of object noise in a given frame or image. Often images are segmented only to locate and positively identify one or very few main images in the foreground of a given frame. The non-primary or background images are often treated as noise. Nevertheless, these can provide useful information, context, and/or branding for example. To fine-tune the amount of object noise cluttering a dataset, it can be useful to provide a user with an option to dial image detection sensitivity. For certain specific embodiments, identification of only certain clearly identifiable faces or large unobstructed objects or band logos can be required with all other image noise disregarded or filtered, which can require less computational processing and image database referencing, in turn reducing costs. However, it may become necessary or desirable to detect more detail from a frame or set of frames. In such circumstances, the computational thresholds for identification of an object, face, etc. can be altered according to a then stated need or desire for non-primary, background, obstructed and/or grainy type images. Such image identification threshold adjustment capability can be implemented, for example, as a user-controlled interface, dial, slider, or button, which enables the user to make adjustments to suit specific needs or preferences.

Figure 4:
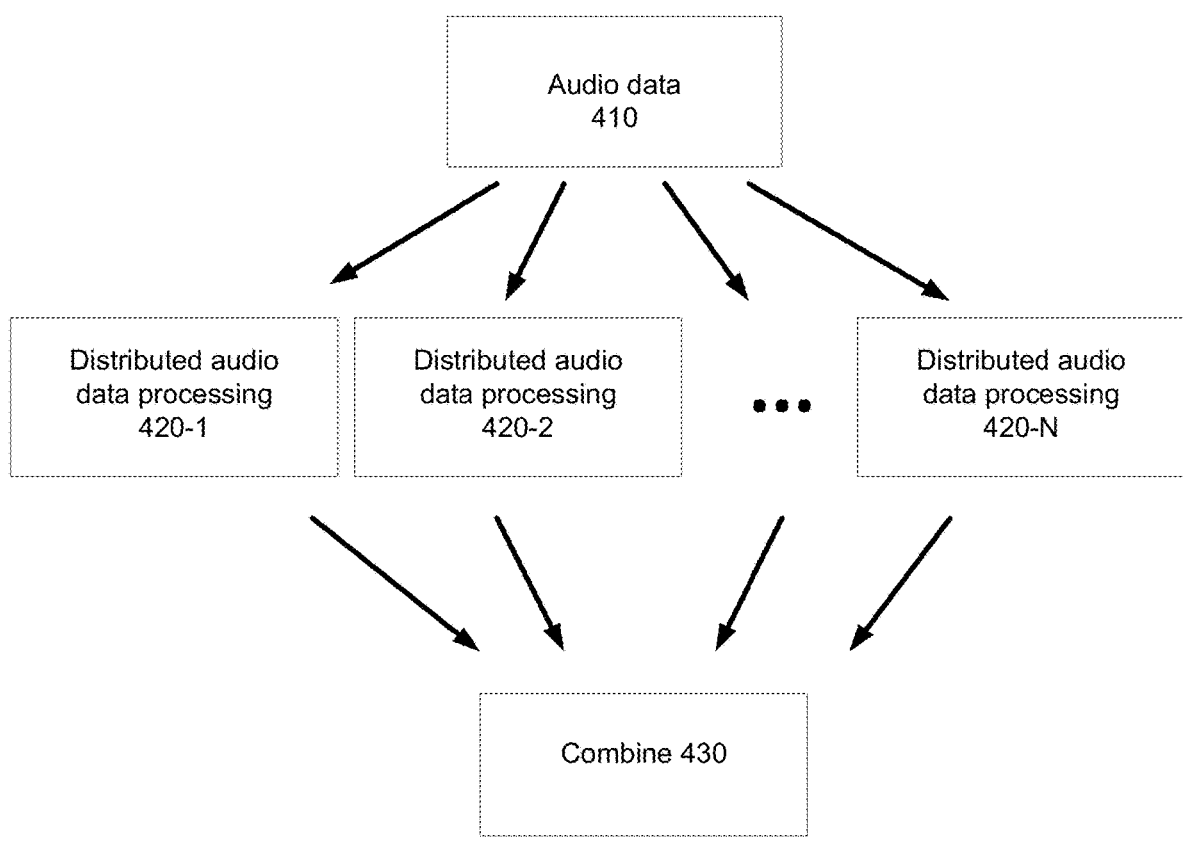
FIG. 4 illustrates aspects of audio data processing.

An example of the audio data processing is illustrated in FIG. 4. In FIG. 4, the audio data 410 can be segmented into N segments and processed in parallel (e.g., distributed processing 420-1 to 420-N), allowing for near real-time processing.

In some embodiments, the segmentation can be performed by a fixed period of time. In another example, quiet periods in the audio data can be detected, and the segmentation can be defined by the quiet periods. For example, the audio data can be processed and converted into a spectrum. Locations where the spectrum volatility is below a threshold can be detected and segmented. Such locations can represent silence or low audio activities in the audio data. The quiet periods in the audio data can be ignored, and the processing requirements thereof can be reduced.

Audio data and/or segments of audio data can be stored in, for example, memory or a storage device discussed above. Copies of the audio segments can be sent to audio processing. The audio data can be saved to a file with processed data and/or processed data can be added back to the source of the audio data, for example as metadata.

The audio data for each segment can be translated into text in parallel, for example through distributed computing, which can reduce processing time. Various audio analysis tools and processes can be used, such as audio feature detection and extraction, audio indexing, hashing and searching, semantic analysis, and synthesis.

At 430, text for a plurality of segments can then be combined. The combination can result in segmented transcripts and/or a full transcript of the audio data. In an embodiment, the topics in each segment can be extracted. When combined, the topics in each segment can be given a different weight. The audio topics can be stored as topics for the entire video or each audio segment.

At 150, an optional step of natural language processing can be applied to the text. For example, based on dictionary, grammar, and/or a knowledge database, the text extract from the audio stream of a video can be given context, an applied sentiment, and topical weightings.

At 160, the topics generated from an image or a frame and the topics extracted from audio can be combined. The text can be cross-referenced, and topics common to both texts would be given additional weights. At 170, the video-to-data engine generates video text, such as text describing the content of the video, using the result of the combined texts and cross reference. For example, key words indicating topic and semantic that appear in both texts can be selected or emphasized. The output can also include metadata that can be time-stamped with frame references. The metadata can include the number of frames, the range of frames, and/or timestamp references.

Figure 2:
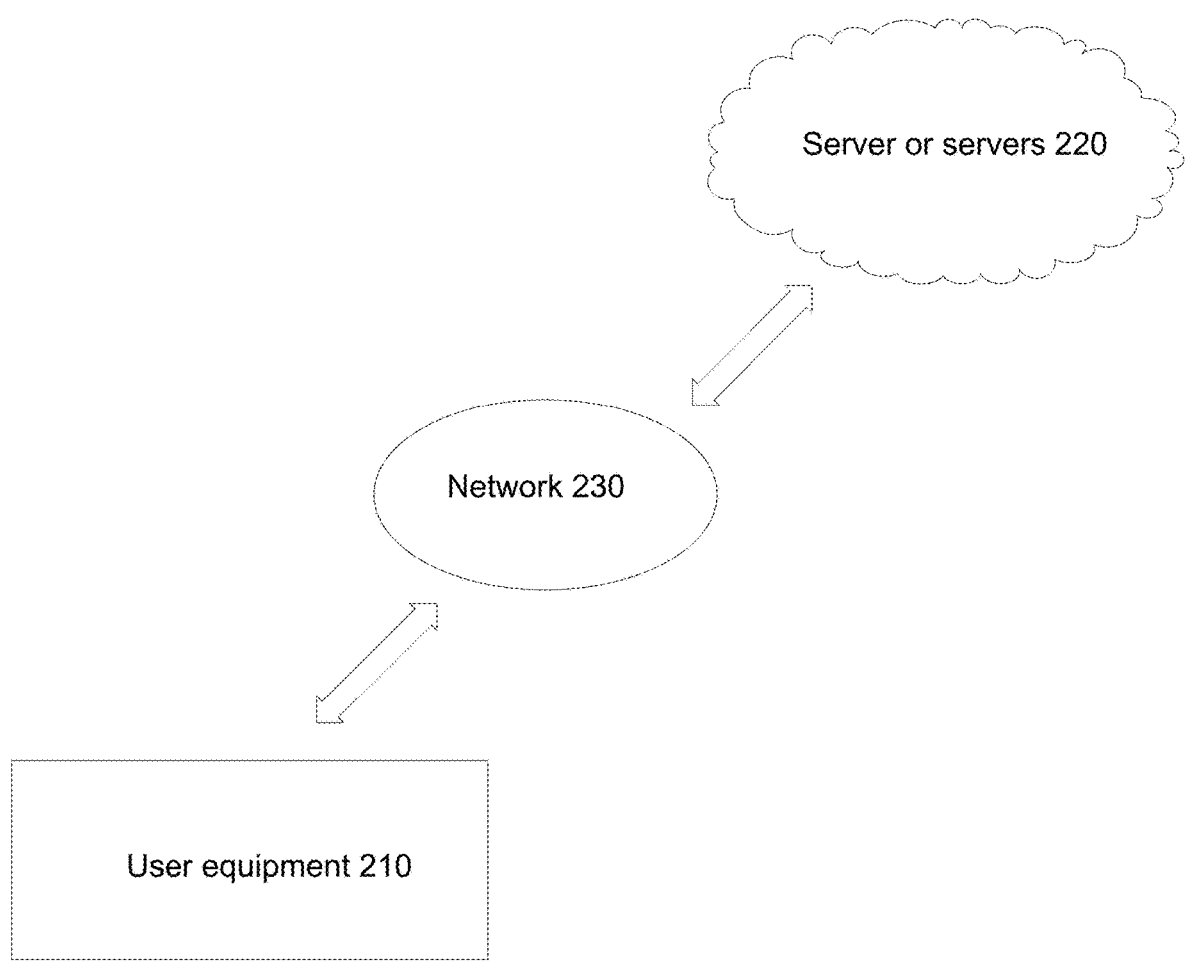
FIG. 2 illustrates an embodiment of image data processing.

FIG. 2 illustrates another embodiment of the present invention. User equipment (UE) 210 can communicate with a server or servers 220 via a network 230. An exemplary embodiment of the system can be implemented over a cloud computing network.

Figure 6:
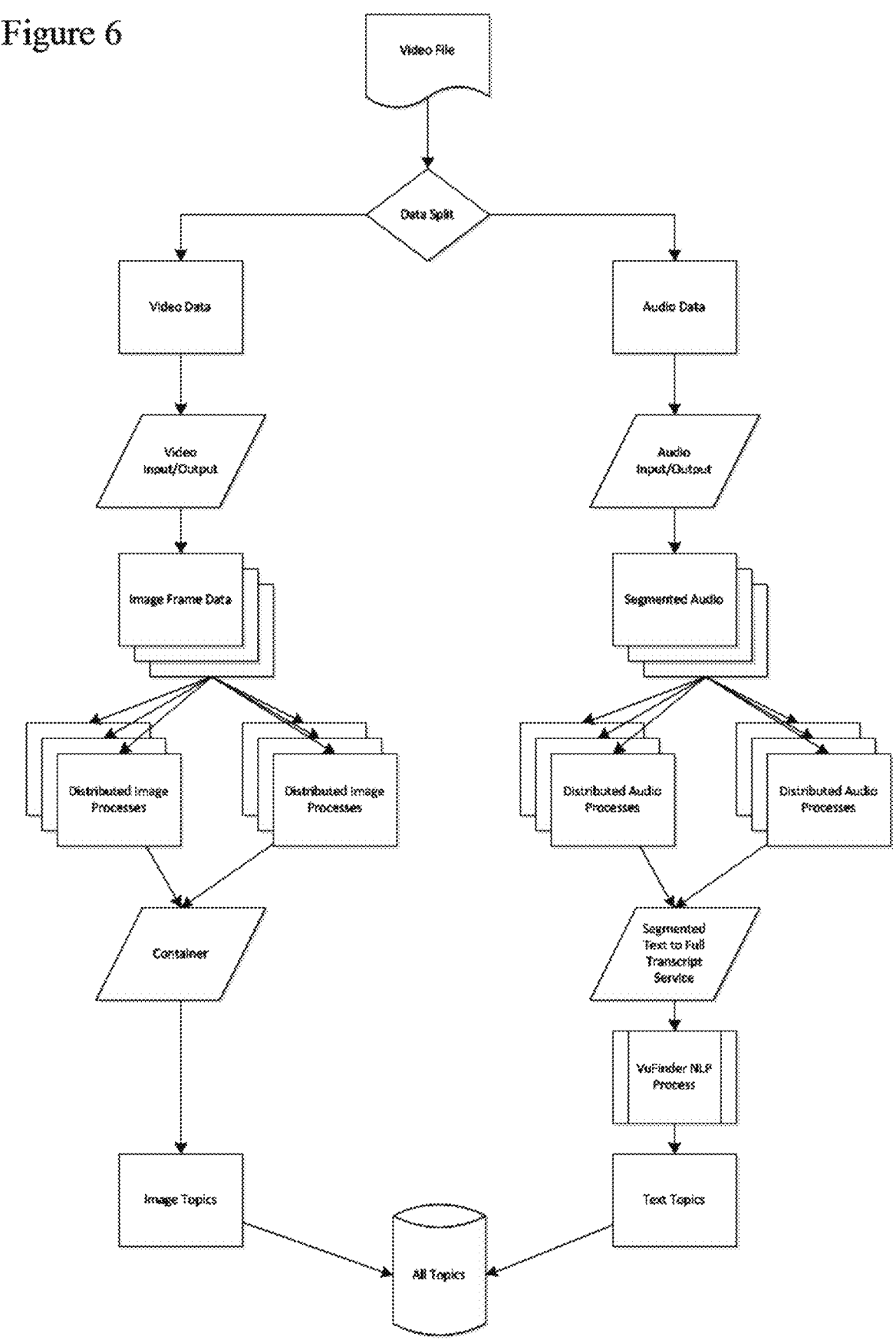
FIG. 6 illustrates a flow diagram of a present embodiment

For exemplary purposes only, and not to limit one or more embodiments herein, FIG. 6 illustrates a flow diagram of an embodiment. A video file is first split into video data and audio data. A data pipeline, indicated in the figure as Video Input/Output, can extract sequences of image frames and can warehouse compressed images in a distributed data store as image frame data. A distributed computation engine can be dedicated to image pre-processing, performing e.g. corner and/or edge detection and/or image segmentation. The engine can also be dedicated to pattern recognition, e.g. face detection and/or logo recognition, and/or other analysis, such as motion tracking. Processed data can be sent to one or more machines that can combine and/or sort results in a time-ordered fashion. Similarly, the Audio Input/Output represents a data pipeline for e.g. audio analysis, compression, and/or warehousing in a distributed file system. The audio can be, for example but not limited to WAV .MP3, MP4, MOV, or other known formats. Also similarly to the video branch, a distributed computation engine can be dedicated to audio pre-processing, e.g. noise removal and/or volume adjustment, pattern recognition, e.g. transcription and/or keyword detection, and/or other analysis, e.g. identifying unique speakers. Processed audio data can be sent to one or more machines that reassemble transcript segments in their correct time-order. A time-stamped transcript can be sent through an NLP, or other preferred system or analysis, which can transform the data in time-ordered topics and/or subject matter. Both branches converge to output data from parallel video and audio pipelines. The output data can be synced into one or more machines that can combine image and audio generated topics and/or tags which can be applied towards a number of user experiences or user-defined outputs. Such experiences can include search engine optimization, video categorization, recommendation engines, advertisement targeting, content personalization, analytics, etc. The output can include metadata that is time-stamped with frame references. The metadata can include the number of frames, the range of frames, and/or timestamp references.

The UE 210 can include, for example, a laptop, a tablet, a mobile phone, a personal digital assistant (PDA), a keyboard, a display monitor with or without a touch screen input, and an audiovisual input device. In another implementation, the peripheral devices can themselves include the functionality of the computer. For example, the mobile phone or the PDA can include computing and networking capabilities and function as a general purpose computer by accessing a network and communicating with other computer systems.

The server 220 can include the general purpose computer discussed above.

The network 230 includes, for example, the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. A communications link can include communication pathways that enable communications through one or more networks.

In some embodiments, a video-to-data engine can be embodied in a server or servers 220. The UE 210, for example, requests an application relating to the video stream. The servers 220 perform the audio-to-text process on the segmented audio in parallel. The distributed audio-to-text processing reduces the overall response time. This method allows real-time audio-to-text conversion.

The UE 210 communicates with the server 220 via the network 230 for video stream application. The video-to-data engine can generate the video text as illustrated in FIG. 2. The server 220 then generates advertisement (text, images, or animation) based on the video text. In some embodiments, the server adds the advertisement to a specific symbol, image, frame, or a specific time in the video stream. The specific symbol, image, frame, or the specific time in the video stream can be selected based on the video text.

The server 220 can add the audio text to the video stream in real time (i.e. real time close caption). The server 220 can generate video recommendation based on a database of the video text. In some embodiments, the server 220 can search videos based on the video text (e.g., via a database of video text). In this fashion, video search can be optimized. Applications for the video search optimization can include search engine optimization (SEO), search engine marketing (SEM), censorship and removal of copyrighted materials.

The video streams can be videos viewed by a user, and the server 220 generates a preference profile for the user using the video data. For example, a user's video can be from a data storage device (such as a disc, a drive, an FTP site, etc.), from a streaming source (such as NetFlix, Apple, Amazon, etc.), from a web browser plugin (such as YouTube, Vimeo, etc.), and/or from other sources. Videos can be provided to the server by the user, and/or videos can be provided by the server to the user.

Figure 5:
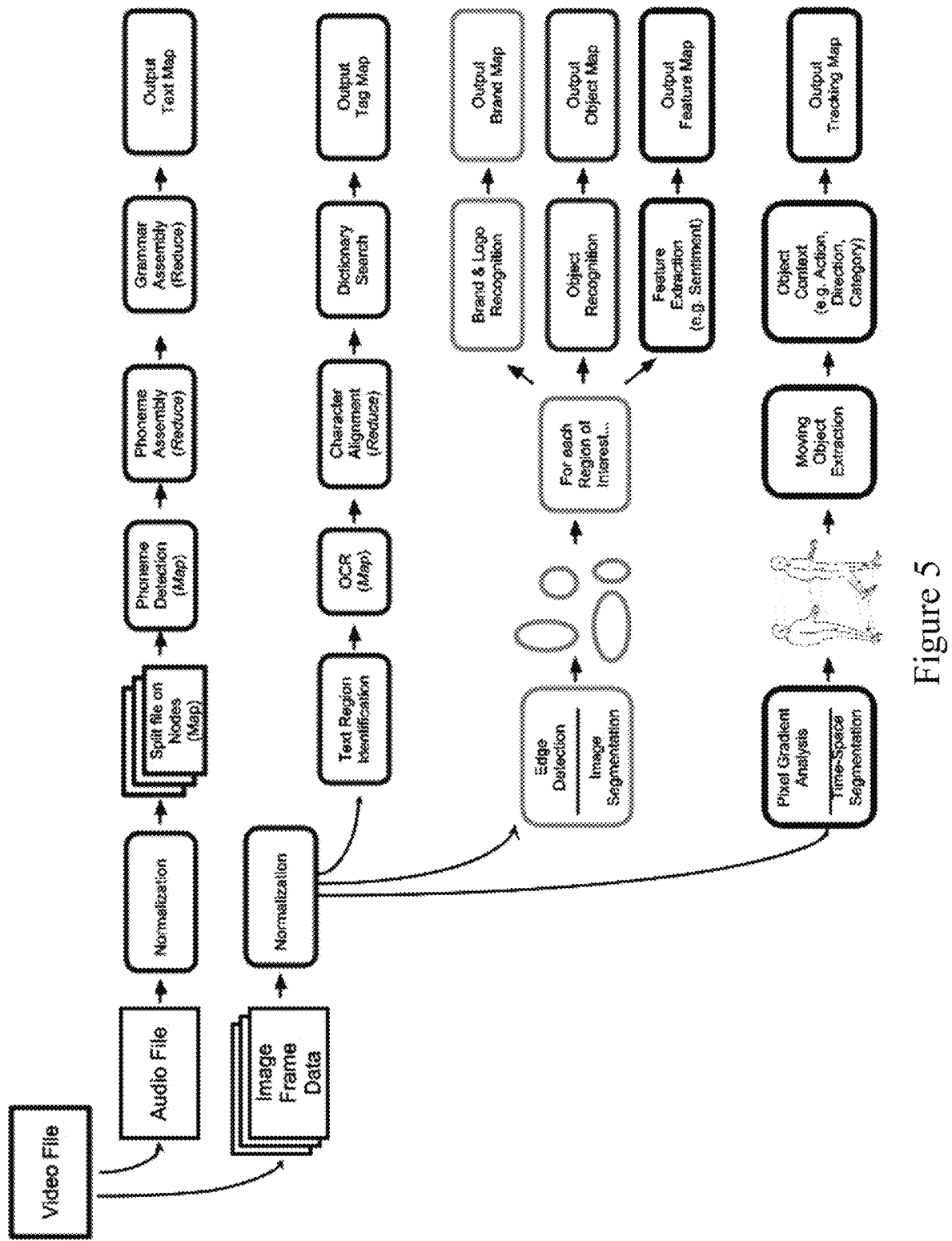
FIG. 5 illustrates various exemplary aspects of embodiments of the present invention.

In an embodiment, as shown in FIG. 5 for example, a server node can fetch a video file. For example, a URL can be used to fetch the video file from a website such as YouTube, and from such URL the video can be scraped. The server can divide the video into chunks of smaller data files for processing on several nodes of a cluster in parallel. For example, the video file can be separated into audio files and image frame files. Each of the types of files can be normalized.

The normalized audio files can be split into constituent files for processing and reduction in parallel by various nodes. Various reduction processes can be performed on the constituent audio files such as phoneme detection and assembly as well as grammar assembly. An output of the audio processing steps can be an extracted text map.

The normalized image frame files can be processed in order to extract various data maps, such as a text map, a tag map, a brand, an object map, a feature map, and/or a tracking map. Such maps can be achieved through various extraction steps. For example, the normalized image frame files can be analyzed for text identification and/or by optical character recognition. The data can be improved through a dictionary verification step. Various maps can be created based on edge detection and/or image segmentation techniques. Such techniques can be improved by focusing on regions of interest, for example based on brands, logos, objects, and/or features of interest. Additionally, or alternatively, pixel gradients of the normalized image frame files can be analyzed and/or the files can be segmented by temporal and/or spatial components, and thus, for example, allow extraction of motion within the video images, which in turn can be used for tracking.

Identification of motion or action in a still image can be a challenge in the vision science field. However, the linear sequencing of frames from a video—as opposed to a stand-alone image—avails itself to motion detection. A series of sequential frames can be analyzed in groups to identify actions, rather than merely objects, or, as a manifestation of data, verbs rather than nouns. For example, an object found across several frames can be identified and the object's motion can be determined with a high degree of accuracy. For further example, a processor can analyze a collection of x sequential frames to identify a basketball found in each frame. The processor then can analyze the motion of the basketball to determine that a basket was made by slam-dunking. Or, a certain automobile may be identified in frame a, with a crashed automobile identified in frame z, with the sequential frames in between a and z identifying the action of said car crashing. The accuracy of the action-identification can be improved by utilizing contextual recognition methodologies discussed herein. For example, the probability of positively identifying a slam-dunk action can be increased if Michael Jordan is identified in the context of the video and/or images. Action identification can be further improved, in addition to modeling context of objects, by analyzing human poses, for example by building a learning set of still images capturing known actions.

Figure 7:
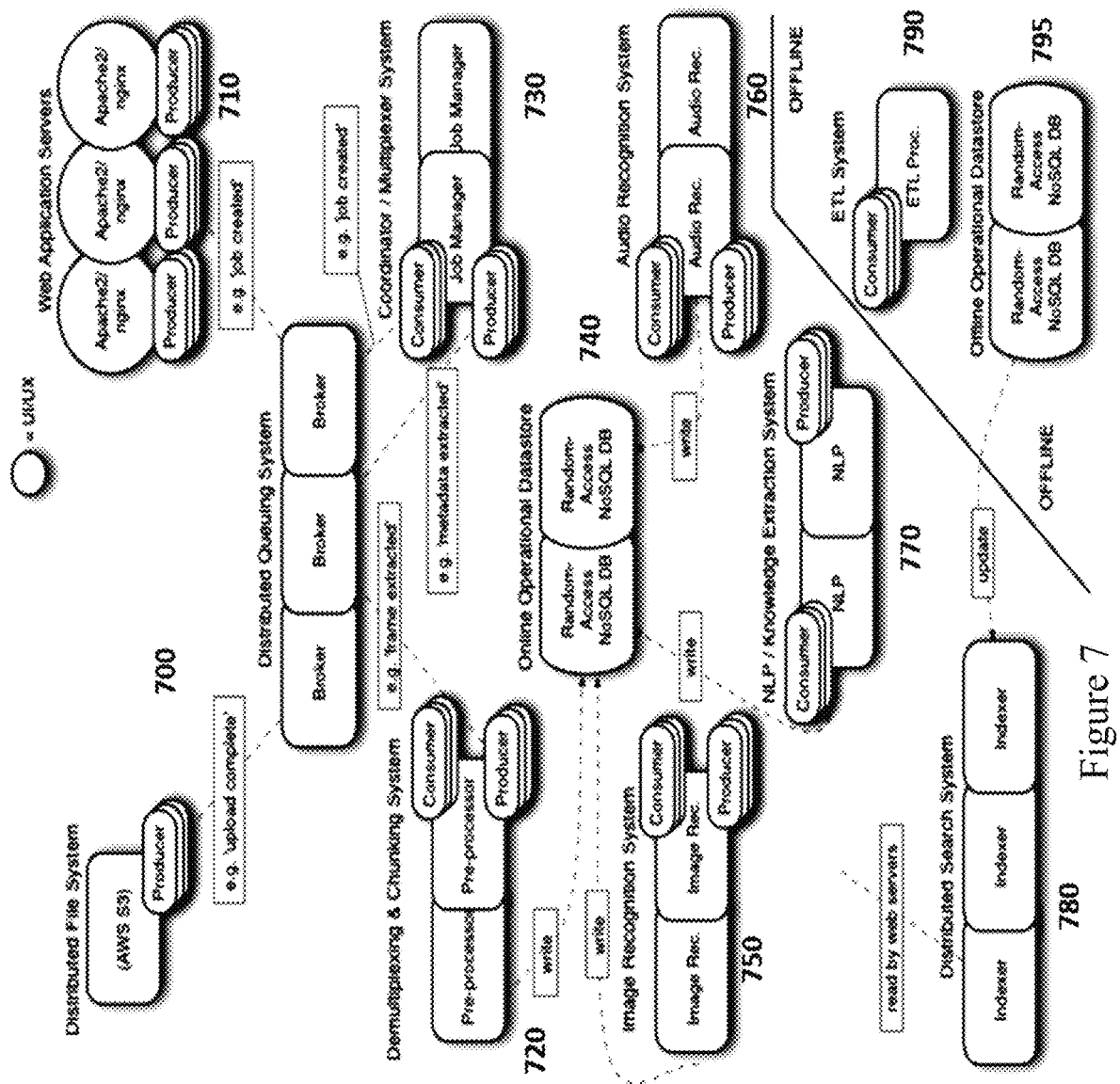
FIG. 7 illustrates exemplary architecture of a present embodiment.

In an embodiment, as shown in FIG. 7 for example, to generate metadata, several sub-systems can operate on the video. An image recognition sub-system 750 can take frames from the video, and isolate and identify objects present in the frame. An audio recognition sub-system 760 can include automatic speech recognition, sound identification and music identification. A natural language processing (NLP) sub-system 770 can annotate and assign meaning to keywords that are generated by the image and audio sub-systems.

The automatic speech recognition (ASR) model can be a set of statistical structures and operation used for determining words from expected audio signals. The ASR model can consist of an acoustic model (AM) and a language model (LM) between which there is near perfect overlap. The acoustic model can map audio speech features to sounds/word-parts. For example, a series of features might be mapped to the "ah" sound in "bath." The language model can consist of a dictionary of known words and their phonetic mappings to sounds/word-parts and a statistical weighting of likelihood of a given word occurring given the previous one or two words. Speech may contain words and phrases not commonly used in "regular" language, e.g., double dribble, free throw, slap shot, high-sticking, etc. Accordingly, the language model can also consist of a topic-specific dictionary, with associated phonetic variants for each word, and may also consist of a statistical N-gram model of word probabilities, e.g., "slam dunk" is a common phrase but will be used more frequently in sports reporting than in general language.

The acoustic model can process audio waveforms to generate a series of speech features based on Mel-Frequency Cepstral Coefficients (MFCCs) that are generated using a series of signal processing techniques including pre-emphasis, cosine or hamming windowing, FFT, Mel-filtering, log power spectrum, DCT and the computation of delta and delta-delta coefficients. The automatic speech recognition can encompass a wide variety of tasks, e.g., connected digit recognition, dialogue systems, large vocabulary continuous speech recognition (LVCSR). Automatic speech recognition can work in part by having a statistical understanding of what words can follow other words.

The following operational sub-systems (710, 720, 730, 740, 780, 790, and 795) can be utilized to support the metadata generation process. Web application servers 710 can provide clients with the ability to use the service provided by the system, e.g., upload, monitor progress and receive outcomes. A video processing sub-system 720 can transform the video file into data on which the metadata generating sub-systems operate. An auditing/coordination sub-system 730 can monitor the overall system performance, and can generate operational and business analytic data. An operational data storage sub-system 740 can store the generated metadata as well as operational and business analytic data for use in active, online processes. A search sub-system 780 can index client results, and can make them searchable via the web application. An offline data storage system 795 can hold the history of all operations performed in the system including business and operational data. An extract-transform-load (ETL) subsystem 790 can regularly write to the offline data storage sub-system.

An architecture based on distributed message queuing and distributed data storage 700 can be utilized to build a scalable system, to optimally allocate resources for performance, and to enhance failure and overload resiliency. A distributed message queuing system can produce data that gets delivered to a particular queue at which time it gets consumed by a component that watches that queue. The distributed queuing system can be removed.

Figure 8:
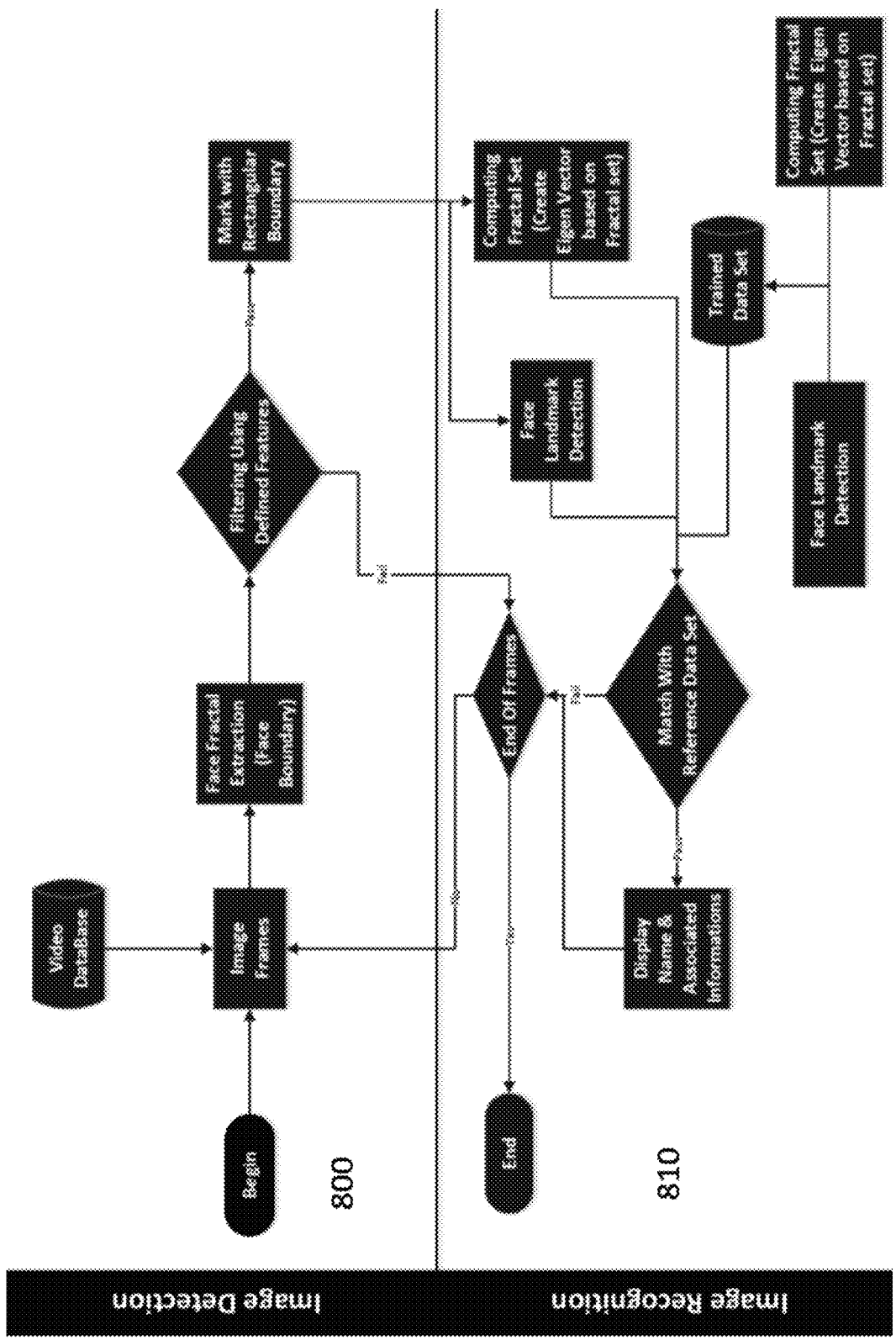
FIG. 8 illustrates a flow diagram of an embodiment of image recognition.

For exemplary purposes only, and not to limit one or more embodiments herein, FIG. 8 illustrates a flow diagram of an embodiment of image recognition. Images can be classified as faces and/or objects. Image recognition can include two components: image detection 800 and image recognition 810. Image detection can be utilized to determine if there is a pattern or patterns in an image that meet the criteria of a face, image, or text. If the result is positive, the detection processing then moves to recognition, i.e. image matching. Fractal computations can occur in recognition. Recognition processing can include creating a fractal representation of the face or object that was detected, performing a match to an existing database of faces and objects, and assigning a value (or a name) to the face or object and then returning to the requesting program.

The system can utilize facial recognition algorithms to identify facial fractals by extracting landmarks from an image of the subject's face. For example, the algorithm can analyze the relative position, size, and/or shape of the eyes, nose, cheekbones, and jaw. These features can then be used to search for other images with matching features. Other algorithms can normalize a gallery of face images and then compress the face data, only saving the fractal data in the image that is useful for face recognition. A probe image can then be compared with the face data. Two exemplary approaches to recognition algorithms can be generally divided into two: geometric, which looks at distinguishing features; and photometric, which is a statistical approach that distills an image into values and compares the values with templates to eliminate variances.

The recognition algorithms of some embodiments can include principal component analysis using eigen faces, linear discriminate analysis, elastic bunch graph matching using the Fisherface algorithm, hidden Markov model, multi-linear subspace learning using tensor representation, and neuronal motivated dynamic link matching. A hybrid using, for example, fractal genesis can be constructed to detect the face with one or more of the elements described above.

Three-dimensional face recognition can also be used. This technique can use 3D sensors to capture fractal information about the shape of a face. This information can then be used to identify distinctive features on the surface of a face, such as the contour of the eye sockets, the nose, and/or the chin. An advantage of 3D facial recognition is that it is not affected by changes in lighting. It can also identify a face from a range of viewing angles, including a profile view. Three-dimensional data points from a face can vastly improve the precision of facial recognition. Although called "facial" recognition, the algorithms can be used to detect other objects, animate or inanimate.

To improve the accuracy of detection, the hybrid can also use the visual details of the skin or other surfaces. This technique, called skin texture analysis, turns the unique lines, patterns, and spots apparent in a person's skin or an object's surface into a mathematical fractal space. With the addition of skin texture analysis, performance in recognizing faces can increase roughly 20 to 25 percent.

Although not a requirement of any embodiment, the following recognition models can be utilized, alone or in combination, and are provided to illustrate exemplary alternative embodiments.

PCA: Principal component analysis (PCA) is derived from Karhunen-Loeve's transformation. Given an s-dimensional vector representation of each face in a training set of images, PCA can find a t-dimensional subspace whose basis vectors correspond to the maximum variance direction in the original image space. This new subspace can typically have a lower dimensionality (often t<<s). If the image elements are considered as random variables, the PCA basis vectors are defined as eigenvectors of the scatter matrix.

LDA: Linear discriminant analysis can find vectors in an underlying space that best discriminate among classes. For all samples of all classes the between-class scatter matrix SB and the within-class scatter matrix SW are defined. A goal can be to maximize SB while minimizing SW, in other words, maximize the ratio det|SB|/det|SW|. This ratio can be maximized when the column vectors of the projection matrix are the eigenvectors of $(SW^{-1} \times SB)$.

EAA: An eigenspace-based adaptive approach (EAA) can search for a best set of projection axes in order to maximize a fitness function, measuring at the same time the classification accuracy and generalization ability of the system. Because the dimension of the solution space of this problem can be large, EAA can be solved using a specific kind of genetic algorithm, for example, evolutionary pursuit (EP).

EBGM: Elastic bunch graph matching (EBGM) can be utilized. Human faces share similar topological structures. Faces can be represented as graphs, with nodes positioned at fiducial points. Edges can be labelled with 2-D distance vectors. Each node can contain a set of complex Gabor wavelet coefficients, for example 40 coefficients, at different scales and orientations, which can represent phase and/or amplitude, called "jets". Recognition can be based on labelled graphs. A labelled graph is a set of nodes connected by edges; nodes are labelled with jets; edges are labelled with distances.

KM: The face manifold in subspace need not be linear. Kernel methods (KM) are a generalization of linear methods. Direct non-linear manifold schemes can be exploited to learn the non-linear manifold.

TT: Trace transform (TT), a generalization of the Radom transform, is a tool for image processing which can be used for recognizing objects under transformations, e.g. rotation, translation, and/or scaling. A trace transform can be produced by computing functionals of the image function along lines crisscrossing its domain and/or along tracing lines of an image. Different trace transforms can be produced from an image using different trace functionals.

3-DMM: A human face is a surface lying in the 3-D space intrinsically. Therefore a 3-D model can be better for representing faces, especially to handle facial variations, such as pose, illumination, etc. A 3-D morphable model (3-DMM) can be utilized to encode shapes and textures in terms of model parameters. The 3-DMM algorithm can recover these parameters from a single image of a face.

BF: The Bayesian framework can be utilized to determine and/or measure probabilistic similarities based on the image intensity differences characteristic of typical variations in appearance between individuals. Two classes of facial image variations can be defined: intrapersonal variations and extrapersonal variations. Similarity among faces can then be measured using Bayesian rule.

HMM: Hidden Markov models (HMM) are a set of statistical models used to characterize the statistical properties of a signal. HMM can include two interrelated processes: (1) an underlying, unobservable Markov chain with a finite number of states, a state transition probability matrix, and an initial state probability distribution; and (2) a set of probability density functions associated with each state.

FG-h: Image intensity differences are characteristic of typical variations in appearance of an individual. A human face is a surface lying in the fractal space intrinsically. Since many of the parameters are self-similar, the fractal model can better represent faces, especially in handling facial variations, such as pose, illumination, etc. An improvement, fractal genesis (hybrid) (FG-h), can integrate components of other algorithms into the fractal model to form fractal genesis.

An advantage of present embodiments includes the ability to provide real-time or faster-than-real-time content output. This can be achieved through one or more components and/or steps. For example, a video file can be distributed across at least two layers for processing. The audio can be converted to text on at least one layer, and the images can be processed on at least one other layer. In some embodiments, natural language processing can abstract topics, sentiments, temporal topic-tagging, and can be used for further optimization and/or machine learning. The layers can include node clusters for parallel processing chunks of the video file into the preferred content. In some embodiments, the files can be maintained and processed in parallel at each step, and then combined into a single data file as one of the terminal processing steps.

Present embodiments have wide application. For example, video indexing, reverse image lookup, video co-groupings and graph searches, and video similarity indexing, as described herein, can be used for searching, for classification, and for recommendations regarding processed videos. Law enforcement and security industries can implement embodiments for object recognition and motion detection. Media, entertainment, and industrial entities can implement embodiments to monitor for trademark infringement, captioning, advertising and targeting, brand and product monitoring and data collection, and marketing analytics. These exemplary implementations are not intended to be limiting, merely exemplary.

Additionally, or alternatively, to actively fetch and scrape a video, the system and method can be automated as a push system and/or a web crawling system. For example, the server can monitor online content of specific providers, such as YouTube, Vimeo, Blip, the growing myriad of video-content creating websites, and/or other online video providers. The system and method can also be used in the context of specific databases and/or stored private video content. Monitoring of published videos can be tailored to search for extracted data relevant to specific requesters. For example, a purveyor of certain products can be apprised in real-time of new content relevant to the products. Such relevant content can include the context in which the products are found in the video, the appearance of competing products, verification of product placement, and other useful information.

Figure 10:
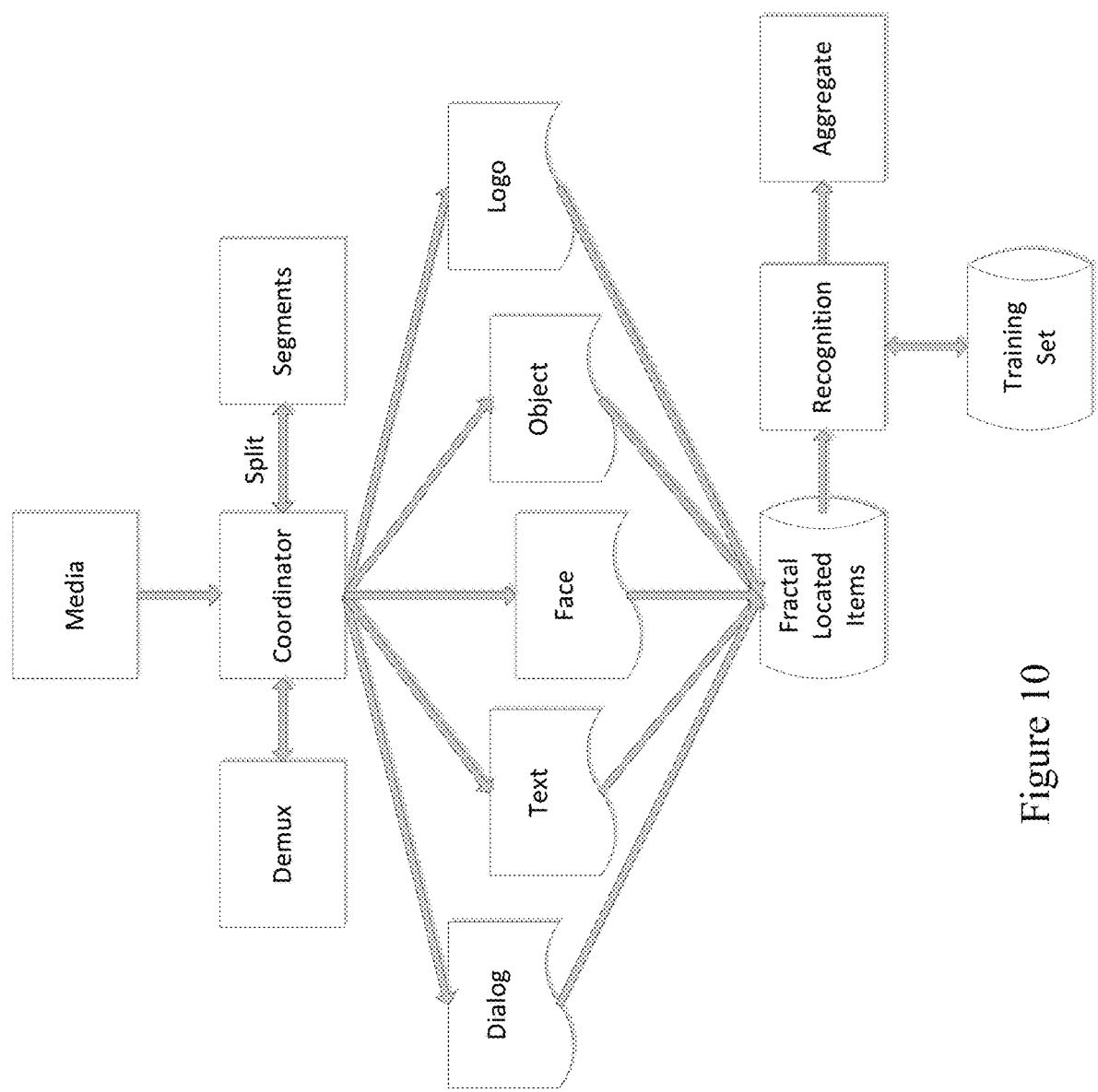
FIG. 10 illustrates exemplary system architecture with an exemplary process flow.

An overview of an exemplary system architecture and process flow is illustrated in FIG. 10. Source media can be provided to a coordinator, which can be a non-visual component that can perform one or more of several functions. For example, source media can be uploaded to a server via a supported protocol such as FTP, HTTPS, direct file copy, etc. The coordinator can be responsible for identifying new job requests and managing the routing of request input and result data output in the system. The coordinator can manage the entire lifecycle of a job from beginning to completion and can manage routing of request input and result data output throughout the system. However, in some embodiments, post processing and pre-processing may be advantageously performed outside of the system. Based on user and/or administrator preferences, the coordinator can be configured among several options, which can be provided to perform in a preferred way for a particular request and/or by default. Various configurations can be set through one of several configuration layers in the system. A user, for example through a web-based user interface, can specify which algorithms and/or processes are required for a specific job. In addition, other elements can be provided such as language preference, optimization for performance versus cost considerations, reference dataset to be used for matching, etc. Asset configurations can also be set. The type of the asset (such as MP4, FAV, etc.), duration or play length, aspect ratio, resolution can all be used to modify system behavior. Other optimizations can also be used as preferred. Default configurations can also be chosen. For example, system level configurations can be chosen to help manage performance and job quality for a broad range of data or asset types, such as preferences for the number of frames per second and/or the desired split duration, such as one-minute splits. Splits can be by frame, by similarities between frames, or other desired splits.

As shown in FIG. 10, the coordinator can send uploaded source media to a splitter and a demuxer/demultiplexer. These components can process the source media and return processed files to the coordinator. Segmented and demuxed files can be sent by the coordinator for further processing to extract data from the source media/processed files, such as faces, text, dialog, logos/branding, and other objects of interests. This processing can be performed by separate processors or by a single processor. Extraction in any one of the branches, or in a plurality of the branches, can be distributed and processed using parallel processing techniques. The source media/processed files and the extracted data can be sent through a filter to compare fractal located items, which is further described herein, for recognition. The recognition processor can further refine the fractal based on results of the fractal filtering, thereby updating the fractal training set, and can output the processed, extracted, and filtered data for aggregation.

Figure 16:
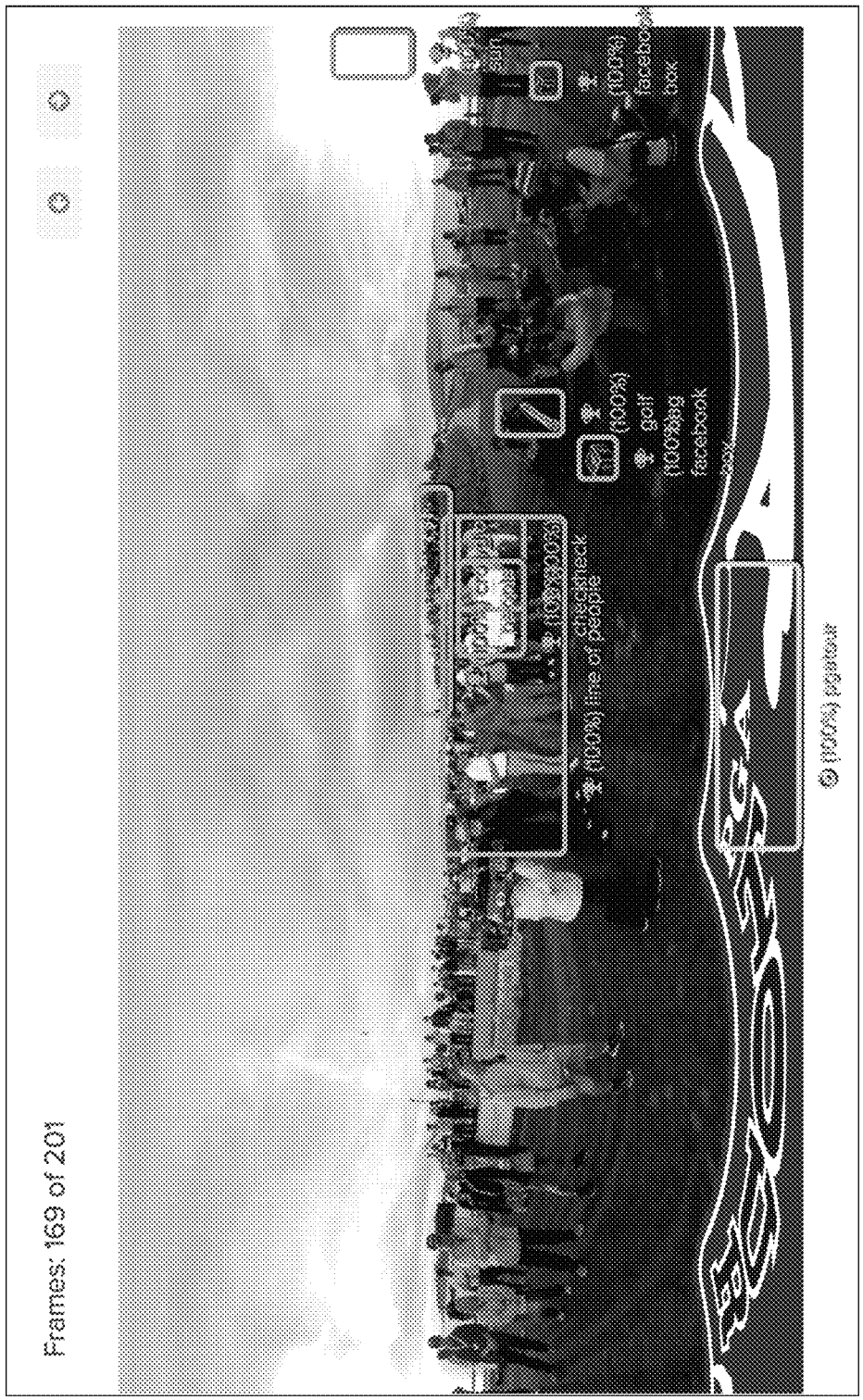
FIG. 16 depicts an exemplary interface showing a 360° image from a virtual reality video file and embedded metadata.

With respect to virtual reality files, once images are extracted from a VR video feed, the process can follow a similar or different process as used for the other flows herein. Image extraction can be implemented somewhat differently. For example in a 3D approach, two images can be analyzed for each frame rather than one image. Some video uses a technique called SBS. For such video, each frame can be split down the middle to generate two images (one for the left eye, one for the right eye) and then process as normal. Some VR video uses an alternative technique called Frame Sequential. For such video, two concurrent frames, which constitute the left and right eye of the image, can be extracted to be analyzed and processed as described herein. Yet other VR video uses a stitched together panoramic or a fisheye aperture. For example, FIG. 16 shows a 360° view, which can be captured by four or six camera angles which are stitched together, or similarly with two or three cameras that have fisheye lenses. Handling of VR content is discussed herein with greater detail, for example, with regard to calibration and processing.

Figure 11:
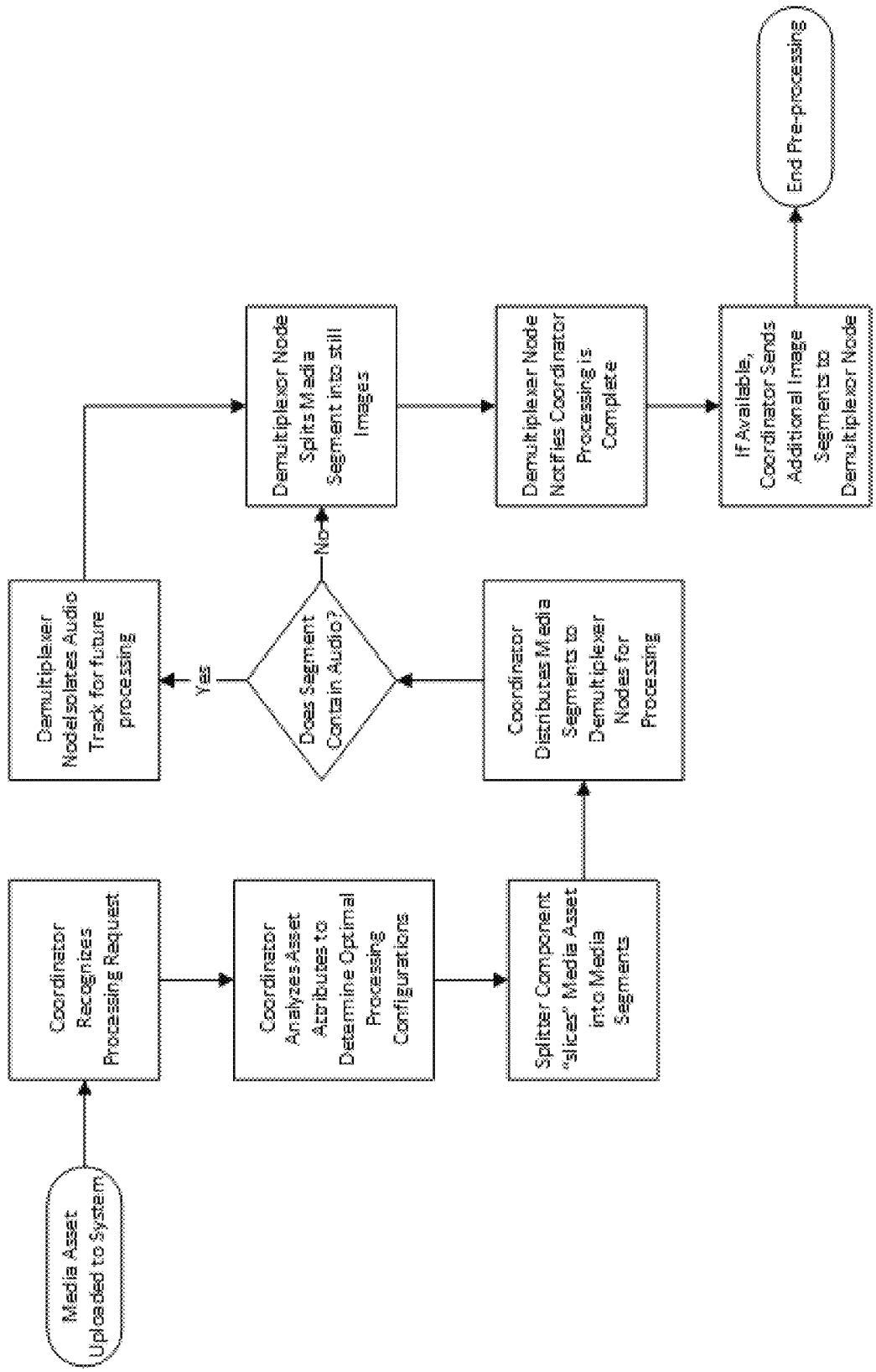
FIG. 11 illustrates an exemplary process for distributed demultiplexing and preparation of source media files.

As shown in FIG. 11, the coordinator can receive media assets and recognize processing requests. The Coordinator can analyze attributes of the assets, such as VR, video, and/or audio media, to determine optimal processing configurations, and based upon such determination, invoke the splitter to "slice" the assets into media segments and/or multiple sub assets comprising the entire stream. The duration of the split assets can be optimized by, e.g., media asset type, format, resolution, load, etc. For example, a thirty minute video media asset of 4k resolution can be configured to split into sixty segments of thirty seconds each. A 1080p-resolution asset of the same content can be split into thirty one-minute segments or split into 120 15-second segments. The segments can then be distributed by the coordinator to the demultiplexer for processing. If a segment contains audio, a demultiplexer node can isolate audio tracks for processing. Once the audio track is isolated, or if the segment lacks audio, the demultiplexer can split the media segments into still images. The demultiplexer nodes can notify the coordinator when processing is complete. The coordinator can send additional image segments to demultiplexer nodes. Upon completion of the demultiplexer process, the coordinator can be responsible (based on the job specification) for determining which algorithms the job requires and sending the demuxed frames to those algorithms. Additionally, the coordinator can further output a processed file and/or generate a process report.

In an exemplary embodiment, the system can notify demultiplexer components that the source media segments are prepared for processing. For each media segment, initially a demultiplexer component can strip audio data from segments and store audio streams for future analysis. The demultiplexer can further convert media segments into individual image stills based upon system or account settings. Generally, the only limitations on the number of frames that can be extracted for a given segment are based on desired resolution. But, implementations can limit the number of frames for practical or preferred levels of precision. The coordinator can also be notified before demultiplexer processing is complete to, for example, improve processing speed. For example, when a demultiplexer component reaches 80% or 85% of capacity, the coordinator can be notified that additional processing resources are necessary. The coordinator can create additional demultiplexer nodes and can then add the additional nodes to the demultiplexer components to send processing requests to the newly created nodes. The coordinator can send processed media as each demultiplexer node completes its processing or after all demultiplexer processing has completed. The coordinator can create any of the types of processing nodes discussed herein, e.g. logo nodes, etc., allowing scalability and improved overall processing times.

As shown in FIG. 12, the coordinator can direct distributed processing and aggregation. The coordinator can analyze job requests and determine—for example, after receiving notification of completion from demultiplexer nodes and/or determining that there are no additional media segments available for processing—which processing tasks are to be completed. Job requests can be configured to use one or more of training, detection, recognition, text extraction, and dialog extraction. Dialog extraction can include analysis of audio stream information and/or recorded dialog (speech) from audio clips to determine the actual text of the dialog, rather than merely assessing whether key words are present in an audio stream. As shown in FIG. 12, a step can include training. A training process can identify which training paradigms to use, such as face, object, and/or logo/branding training. Images can be sent to training processing nodes with attributed metadata. Face training can include adding identified reference data to the facial recognition dataset for use during the recognition process. Similarly, object training and logo/branding training can include adding identified reference data to the object recognition datasets and logo recognition datasets, respectively, for use during the recognition process. A fractal can be created (if a first instance) or refined by analyzing the images. The new or updated fractal can be stored with metadata in a reference dataset. The training processing can be iterative and/or distributed until training has completed.

Upon completion, or in the absence of, training, detection and/or recognition can be performed. Where recognition is not required or not desired, the image extraction can be performed, the results of which can be directly aggregated. Alternatively, objects can first be detected in the images. Possible objects of interest in the images can be stored and/or processed for possible comparison against a reference dataset (which can be the fractal itself). The comparison process can score confidence in a particular recognition analysis. The recognition score, the object of interest, and the image can be stored as a file or other associated dataset, and the set can be aggregated as results in a processed media asset.

When new images are available for processing, the coordinator can identify retrieved image data for analysis and conversion into fractal data. Fractal datasets can be stored in one of several distributed key-value datastores optimizing read/write performance using key algorithm of:

$$FT(s)=F_O+A$$

where FT is the frame timestamp in seconds, $F_O$ is the frame offset (an integer), and A is the algorithm key that can allow multiple read write strategies to be optimized for training or recognition operations. Examples of an algorithm key, A, can be but are not limited to hashing the reverse timestamp, A mod N (where A is a userID integer and N is the number of nodes), etc. The algorithm key, A, can be open-ended based on user preference and can allow organizing chronologically, by logos, alphabetically by key word, based on geotags, etc.

Upon updating the fractal, the original image can be purged from system memory leaving only fractal dataset as an entire data representation. The system can be configured to retrieve image data as streams from remote systems, which can alleviate memory and storage constraints by not requiring that the original image data come to rest on host systems.

For detection and/or recognition requests, fractal datasets can be compared to a reference dataset and/or scored with a probability of a match based on comparing individual fractal values against one another. A node can store a potential match, a match score, and an associated key of the match in the reference dataset. A processing node can notify the coordinator that processing tasks are complete. If additional training, detection, recognition, or extraction processing tasks are still required, the coordinator can send new requests to processing nodes.

Face training can create a reference dataset that is used for future comparison of image data for the purposes of facial recognition. These reference datasets can be enhanced and improved over time to increase the likelihood of accurately determining which faces are present in a given still frame. In addition, entire reference trained datasets can be swapped out for other sets to address domain and/or industry specific needs, such as, e.g., employee images, professional athletes, known criminals, etc. Users and/or administrators can also create entries for persons in the reference dataset, such as providing metadata associated with the entry, including but not limited to name, profession, gender, and other attributes. A series of images for the person can be uploaded, and the system can focus on a set of good quality face shots to be analyzed by the training system. Additional entries can be created and/or uploaded for further improving the fractal dataset.

In some embodiments, a user can initiate a training job request. For each image in the training request, the system can validate that at least one face can be detected by the system and can discard images that do not contain detectable faces. The system can extract detected facial components for each image supplied for a given person entry and create an aggregated series of image entries for that person. The system can aggregates entries for all persons into a combined dataset, called a gallery. The system can create archives of gallery data, which can be used to support trained dataset rollback, swapping, and caching. The system can also notify users when training job requests are complete.

The facial detection and recognition subsystem can allow uploading, or otherwise capturing, digital video for analysis and/or processing. These subsystems can determine if and/or where faces can be detected in the video and whether the faces can be matched within a certain confidence with the face dataset produced during the training process. These subsystems can produce, e.g., timestamps, x- and y-coordinates, confidence scores, and other metadata associated with recognized faces. In an exemplary process, a face detection worker thread can be notified that an image is available for processing. The image can then be analyzed to determine if there are faces within the frame and discard any frame that does not contain detectable faces. For those with detectable faces, the system can then compare detected facial features such as landmark features and other elements to determine, within a configurable tolerance, whether detected persons are in the trained dataset. The system can generate results such as those discussed above (i.e. timestamps, coordinates, confidence, etc.) for each face detected in each frame.

Object training can rely upon training a series of images through two algorithms, support vector machine (SVM) and histograms of oriented gradients (HOG). This approach can be similar to other algorithms discussed herein in that a reference trained dataset can be created and used for comparative analysis and for future processing operations. An object entry can be created within the system that indicates, e.g., object name and type. A series of images can be uploaded of that object type (for example, firetruck, basketball, etc.) including different angles, sizes, and representations of the object type. Bounding boxes can be created to indicate x- and y-coordinate pairs containing the object type or part of the object type in each image. Training can be initiated, such as by a user request to the system.

SVM is a classifier that can be used to create a reference dataset or train a set of data. SVM training can be performed on a given set of images for the object type. For example, a subset of 100 of the best candidate images for each object type can be used. Best candidate images can be selected by, for example, removal of occluded or corrupt images from the candidate list, removal of duplicate images, and/or inclusion of all images marked as preferred during the upload process. Remaining images can be determined by, e.g., selecting images with the largest bounding boxes for the object type being trained. SVM analysis can be performed for each image and the results can be stored in the trained dataset.

HOG is a feature descriptor for computer vision and image processing that can be used for image analysis and/or object detection. Generally, HOG can count occurrences of gradient orientation in localized portions of an image. This can be similar to other feature descriptors—which can be used by the system—such as edge orientation histograms, scale-invariant feature transform descriptors, and shape contexts. HOG can be computed on a dense grid of uniformly spaced cells and can use overlapping local contrast normalization for improved accuracy. HOG training can include multiple stages. For example, in a first HOG training stage, the system can analyze an image and create a dataset entry, combining annotated metadata with the image at the corresponding bounding box. This process can be repeated for each image indicating what and where the object is within each image. In a second HOG training stage, the image can be analyzed using a custom HOG algorithm. Results of the analysis can be added to trained datasets for analysis and/or future comparison.

Similar to object and facial training, the system can perform logo training. For example, images containing desired logos and/or branding can be uploaded to the system. Bounding boxes can be created around corresponding logos and can add corresponding metadata including logo name, effective dates, etc. After uploading the desired number of logos to be trained, a training request can be initiated. For each item identified in each image, fractal extraction can be performed for each item. Fractal data can be associated with uploaded metadata for each item in the gallery and persist in a datastore. The system can generate a notification when a logo training job has completed.

The object recognition subsystem can analyze each image to determine if the images contain known items and to determine whether, within a configurable confidence, an item matches a known item in the trained dataset. Trained datasets can also be generated for unknown items. This can allow highly refined fractals to be generated and ready for recognition upon discovery of the unknown item. For example, the system may not have a fractal dataset for a specific object, such as a submarine. But the system can detect submarines as an object in images, even though the system does not recognize the submarine for what it is. The system can create a ghost fractal of the unknown object, in this example a submarine. As additional images of submarines are detected and confirmed by comparison to the ghost fractal dataset, the ghost fractal can update and improve. When the system subsequently learns that the ghost fractal is for submarines, the fractal is ready for immediate recognition analysis.

For object recognition, an image can be analyzed using the SVM process to decompose the image into an SVM dataset. The results can be compared to known SVM datasets. This process can be used to produce a forced rank list of potential candidate objects. HOG analysis can be performed on a source image. For each candidate image identified through the SVM process, the closest matches can be returned with a corresponding confidence score. Results can be stored in output dataset.

Similar to object and facial recognition, the system can recognize logo and branding. The system can load trained logo fractals into memory. For each image to be analyzed, the system can determine if there are words, symbols, or other logo/branding information present in the image. For each image, the system can also perform a minhash function to determine if the extracted fractals are similar to items in the trained dataset. The system can further perform spatial mapping analysis against fractals that passed the minhash step to determine possible matches and confidence scores. Possible matches can be stored and/or sorted in confidence score order in a result dataset.

Recognition can be improved based on near-frame proximity. This process can be used to improve recognition operations and reduce false positives using contextual information based upon near frame proximity of similar items. For example, when a specific face is recognized in a given frame against the reference dataset, there is a certain likelihood that the specific face will be in previous and/or subsequent frames. A recognition match can be identified against a reference dataset with a configurable but reasonably high probability confidence score.

Figure 13:
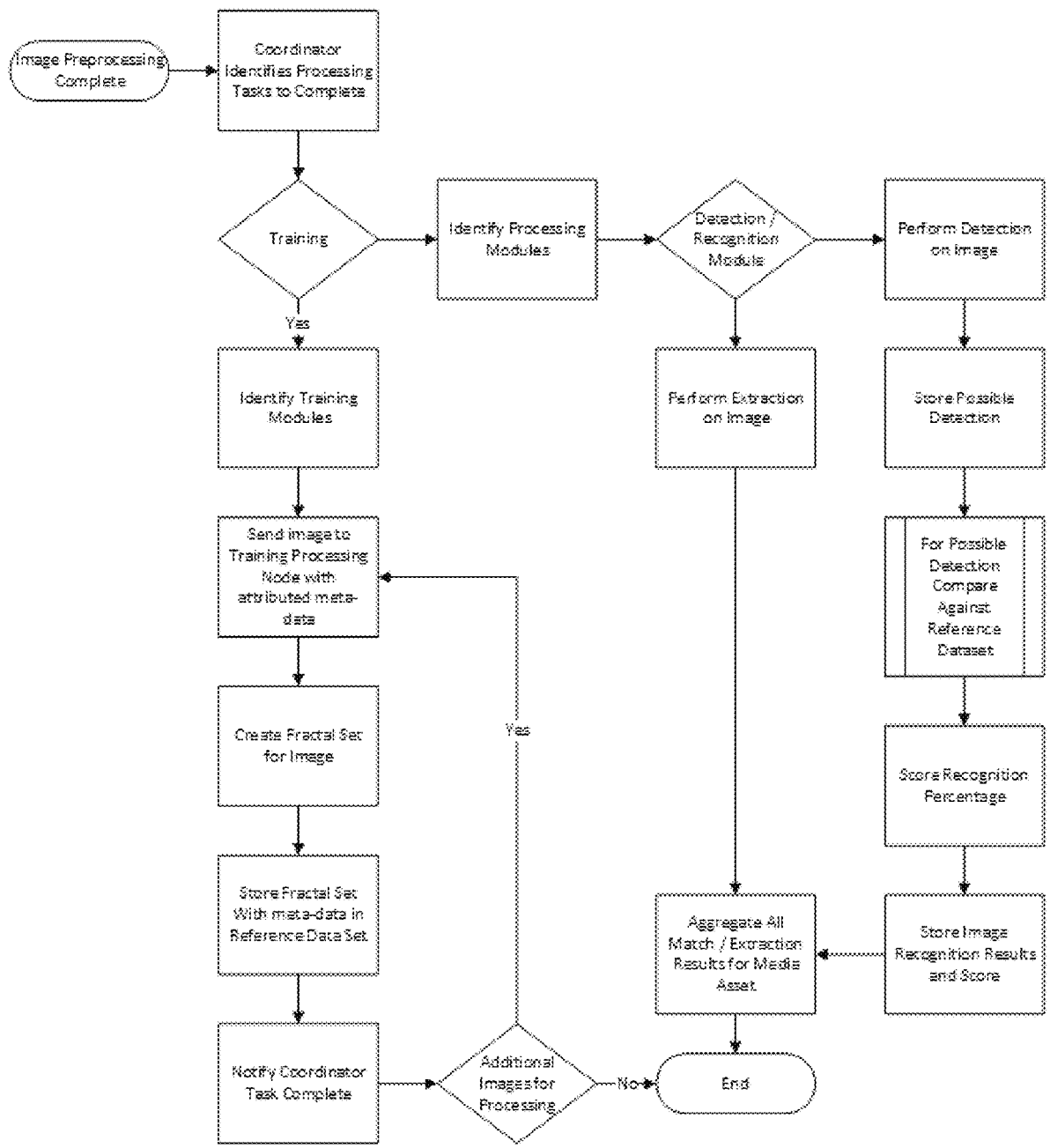
FIG. 13 illustrates an exemplary process for improved recognition based on near frame proximity.

FIG. 13 shows a subroutine for improving recognition. In a first step, initial processing is completed. The exemplary system can identify and recognize matches. The system can flag any potential false positives. If the system identifies, for example, a single frame match, the system can flag the match as a probably false positive, and can update the fractal. If the system analyzes a range of frames prior and subsequent to the potential false positive and detects similar or identical matches, then the system can identify the border frames, i.e. the adjacent frames in which the matched item does not appear. The system can reprocess the border frames based on the augmented reference set.

Frame identifications can also be improved. Upon completion of initial processing, a result set for a series of high confidence frame matches can be analyzed and utilized to identify previous and subsequent frames. These frames can be reprocessed for recognition with newly identified matches added to the reference set. Individual frames can be analyzed until no matches are returned. A result dataset can be updated to reflect the new frames to the original pass. Reduction of false positives can improve several aspects of the system and method. Potential false positive matches can be flagged. One way to reduce false positives is by analyzing the result set for single frame matches with no corresponding matches within a range of adjacent frames. Such analysis can be done, for example, during an initial processing pass or after completion of a detection step.

Recognition can also be improved based on partial three-dimensional matches. For example, recognition match percentage can be improved based on the ability to identify and/or upload three dimensional image representations to the reference dataset, which can be based upon results derived from initial or near frame matches as outlined above. In an exemplary embodiment, a system can identify recognition matches during initial processing. Near frame proximity matching can be performed, e.g., as outlined above. Flags for false positives can be generated for further analysis. If the confidence score for a given match is above a configurable value, the match can be determined and an indication generated that the match is a rotation. This information can be added to the 3D reference dataset for that image for future reference. If the confidence score is lower than a configurable value, the possible match can be discarded or is flagged for further analysis. Such further analysis can be performed by, e.g., an administrator, a user, or an additional machine learning module. Upon further inspection, if the flagged, suspect match is not a match, this information can be added to the reference dataset as a non-match to further refine the fractal for that item. Optionally, the original media asset can be reprocessed and/or media assets including similar images can be processed with the new reference dataset to ensure that mismatches do not reoccur.

Figure 14:
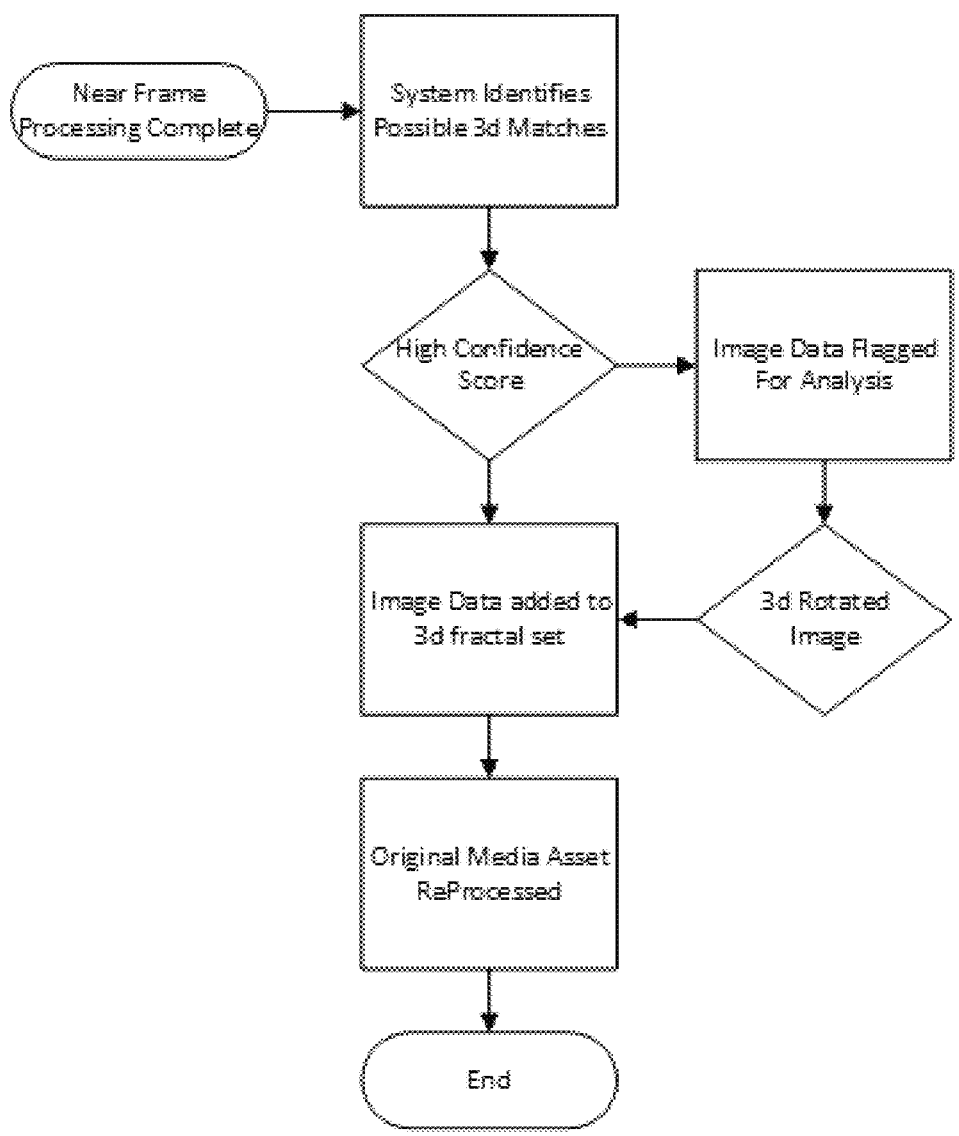
FIG. 14 illustrates an exemplary process for improved recognition based on partial three-dimensional matching.
Figure 15:
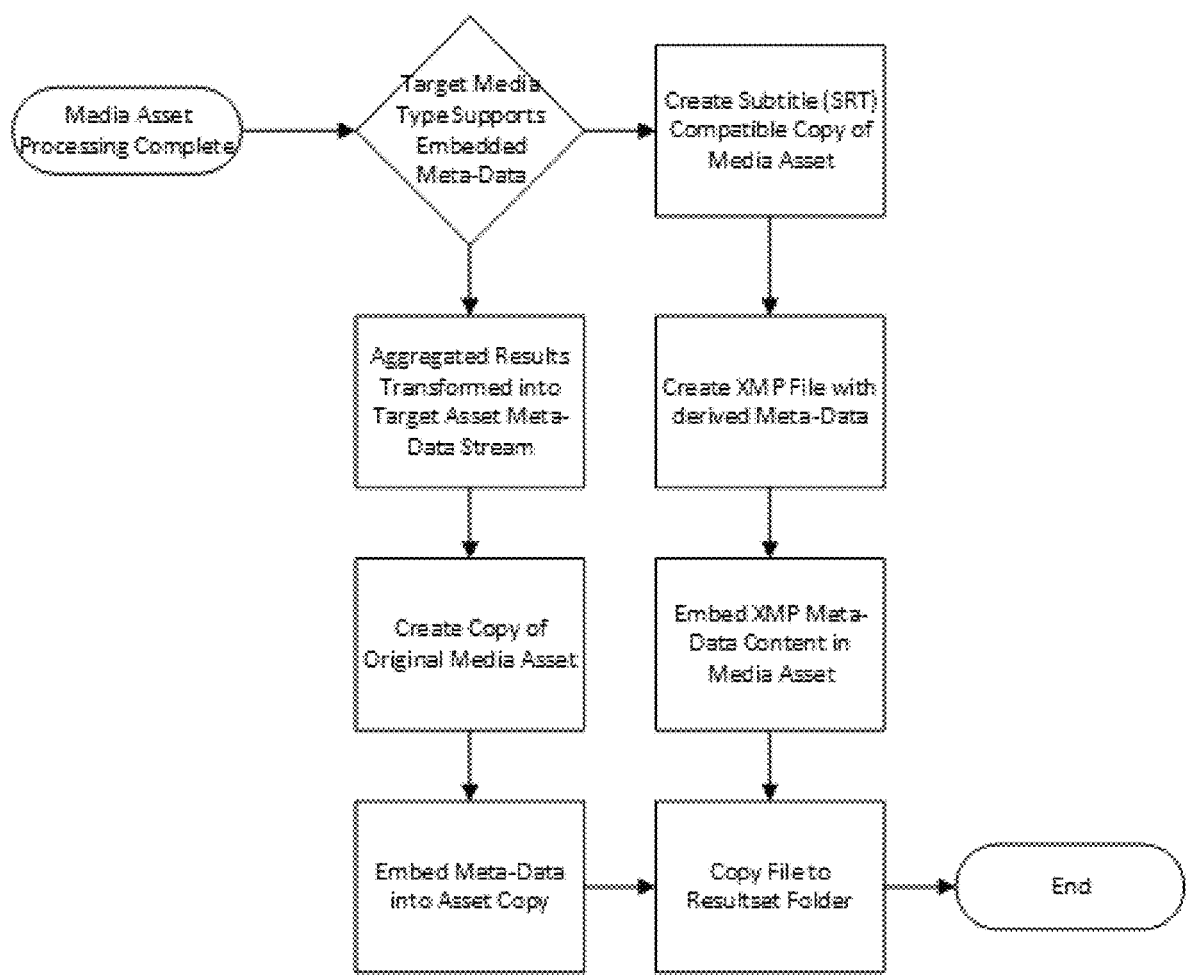
FIG. 15 illustrates an exemplary process for embedding extracted data to original source files as metadata.

FIG. 14 shows a subroutine for improving recognition based on partial 3-D matching. The system can identify possible 3-D matches. If the confidence score for a specific item is high, the image data can be used to refine the 3-D fractal. Image data for those matches with low confidence scores can be flagged for analysis, and if it is determined that the item of interest is a 3-D rotation of a good match, the image data can be added to the 3-D fractal. The original media asset can then be reprocessed.

An exemplary process can utilize output text file of audio extraction, in addition to any post job modifications, to create industry standard files. An XMP file that can contain enhanced metadata can be added to the original asset when the media type supports embedded metadata, and an XMP sidecar file can be utilized when the destination format does not support the embedded metadata. Many assets in the original large form such as MKV, VOB, etc. support embedding data directly, and many tools exist today to do so. However, once the asset is compressed to a file type such as MP4, then an XMP sidecar can be required. Nevertheless, many media players can read the file if it is in the same location as the media itself. A benefit is that the audio track does not need to be displayed as only text, and this mechanism can be used to embed any data at specific timestamps and durations. As an example, a simple SRT entry not related to text can be as follows.

```
1
00:02:17,440-->00:02:20,375
Titleist Golf Logo Identified
2
00:02:20,476-->00:02:22,501
Coca-Cola Logo Identified
```

The system and method can embed extracted data within the original source media as metadata. The derived digital metadata can be embedded into the original media asset type so as to comply with industry standards for ancillary metadata files, which can be read by commercially available media players, and/or as proprietary data types. In some embodiments, the system can process aggregated results from a media asset. The system can generate metadata streams to be embedded in the original media asset, identifying timestamps, corresponding recognition information, and extraction data. An Extensible Metadata Platform (XMP) file can be generated as part of the result set (XMP Sidecar) if, for example, the target media type is not supported. The system can create one or more copies of the original media asset to, e.g., support closed captioning, such as Subtitle Resource Tracks (SRT) and/or Web SRT. The system can embed content of the XMP file into the close captioning stream compatible asset.

While the SRT protocol was designed for closed captioning, embodiments can advantageously utilize the SRT protocol in ways that were not previously utilized to achieve new functionalities discussed above and elsewhere herein.

In traditional, full-360° VR images, a camera is stationary creates a traditional full 360 panorama the camera is stationary and rotates around an axis and has plenty of time to get all of the way around. A different technique can use several images that have overlap and are stitched together to complete the panorama. In both cases, the images can be truly flattened. For such images, flattening the VR video file can be straight forward and can, in some cases, only require splitting the images into sub-frames. However, such VR video can be uncommon. Calibration, therefore, can be an important step prior to image detection and/or image recognition for VR images. While a fractal can be trained to recognize images that have been warped for VR, the increased information associated with a larger set of potential positive identifications can degrade efficiency of the fractal, albeit in some contexts more and in some less. Accordingly, various calibrations can be utilized to improve recognition and efficiency, or at least with minimal cost to efficiency. In some embodiments, each camera's view can be calibrated, and frames from each camera can be independently processed. In other embodiments, a predetermined range or degree of view of the images can be chosen to optimize the calibration's effect on image flattening and/or processing time. For such video, images can be calibrated to a reference image so that the platform can flatten the image for analysis. This can also be done to account for different lenses having distinct characteristics. Further, calibration settings for each lens type can be stored to be used for additional video from specific lenses.

An exemplary embodiment can include steps for calibrating distorted images that have been extracted from panoramas and/or fisheye lens captures of VR movie files. In some respects, this can be considered a reverse of stitching and can require input to aid flattening images. This can be accomplished by various standalone tools or can be incorporated with other aspects described herein.

Figure 17:
FIG. 17 is an image of the Kress Building in Ft. Worth Tex. as taken by a fisheye lens, as used in virtual reality images.

FIG. 17 shows a distorted image prior to calibration. VR video files including images, such as the image in FIG. 17, can be broken down into individual frames similar to 2-D processes above. A calibration step can be performed to create the correct aspect ratio and reduce distortion to improve recognition capabilities. A reference image can be displayed to allow configuration of a baseline set of adjustments for converting fisheye, panorama, and/or other wide angle views, which can be converted to rectilinear images for processing. The system, or a user, can adjusts some or all of three pitch angles (roll, pitch, yaw). Roll calibration can establish base x- and y-coordinates relative to image boundaries. This can improve alignment of images, for example where a camera was titled. Pitch (i.e. the camera's perspective across the y-coordinates) can be adjusted to establish a vertical central alignment point. This can offset certain wide angle distortions that can increase significantly at the image boundaries. Yaw calibration can establish camera perspective across the x-coordinates and can establish a horizontal central alignment point for reasons just discussed. Calibrating camera depth can also establish the field of view for the z-axis and can be leveraged, e.g., to crop unusable areas and to maximize viewable area for a given wide angle video capture. Additional distortion calibrations can be applied using image filters and techniques, for example, where known horizontal and vertical surfaces are independently adjusted using an image manipulation tool, e.g., Pixel Bender, Light Room, Photoshop, etc.

Figure 18:
FIG. 18 depicts a distorted image after calibration according to present embodiments.

FIG. 18 shows the distorted image of FIG. 17 after calibration according to the above described steps. Once calibration settings have been determined for a reference image, such as the image in FIG. 18, processing can begin on subsequent images with the specified settings. Setting profiles can be saved for future use and can be based on but are not limited to camera type, lens used, file format, and/or resolution. Once images have been transformed into rectilinear or near-rectilinear, identification and recognition steps as discussed herein can be utilized for each frame.

Calibration can be performed using known or typical properties of a VR video. For example, in FIG. 16, objects near the center of the image are distorted only slightly compared to objects at the periphery, especially compared to objects at the top and bottom of the image. Specifically, people shown in the center of the image are substantially proportionally correct. On the other hand, the rectangular PGA logo at the bottom of the image is significantly distorted. This knowledge regarding the distortion in this particular image can be utilized for calibrating the rest of the image as well as the other frames in the video. For example, image detection and recognition can be performed on a sample portion of the VR video. Objects near the center of the VR sample are more likely to be recognized during this initial processing. Such recognized objects that move closer, but not all the way, to the periphery during the course of the video can have a relatively high recognition confidence score. The system can then determine the amount of distortion between the two recognized objects. The system can then calibrate that portion of the frame for each frame of the sample according to the change in coordinate size of the object. In some cases, a rectangular shell in which the distorted object lies can be calibrated based on the amount of distortion measured. One or more additional steps can then be performed, such as reprocessing the sample to determine if additional objects are recognized and/or reprocess the sample to determine if the recognized object can be recognized in a partially-calibrated portion of the frame further from the center. In the latter case, an additional calibration can be performed to that farther region, and reprocessing can be performed. Interpolation can be performed based on the distance from the first location of the recognized object to the second location of the recognized object and the change in dimensions between the object at each location to further refine calibration of the sample. These steps can be iteratively performed until the entire frame is calibrated. Once calibration of a sample is complete (e.g. determination of mapping coefficients until a certain number of object are recognized, confidence scores reach a certain threshold, or per user preference of the calibrated image) the entire VR video can be corrected for distortion.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, from the foregoing it will be seen that this invention is one well adapted to attain all the ends and objects set forth above, together with other advantages. It will be understood that certain features and subcombinations are of utility and may be employed without reference to other features and sub-combinations. This is contemplated and within the scope of the appended claims. All such similar substitutes and modifications apparent to those skilled in the art are deemed to be within the spirit and scope of the invention as defined by the appended claims.

The invention claimed is:

1. A system for generating data from a video, comprising:
    a coordinator communicatively coupled to a splitter and to a plurality of demultiplexer nodes, wherein the splitter is configured to segment the video, wherein the demultiplexer nodes are configured to extract audio files from the video and to extract still frame images from the video;
    an image detector configured to detect an image of an object in the still frame images, wherein the image detector is adjustable to increase detection of non-primary images in the video; and
    an object recognizer configured to compare the image of the object to a fractal, wherein the fractal includes a representation of the object based on landmarks associated with the object, wherein the recognizer is further configured to update the fractal with the image.

2. The system of claim 1, wherein the coordinator is configured to increase the plurality of demultiplexer nodes when a threshold of processing capacity is reached.

3. The system of claim 1, wherein the recognizer is configured to determine distinguishing geometric features of the object.

4. The system of claim 3, wherein the distinguishing geometric features comprise a contour of eye sockets, a nose, and a chin.

5. The system of claim 4, wherein the recognizer is configured to determine skin textures of the object.

6. The system of claim 5, wherein the distinguishing geometric features or the skin textures are determined based on a three-dimensional model.

7. The system of claim 6, wherein the three-dimensional model is a three-dimensional morphable model.

8. The system of claim 1, further comprising a processor and a camera for capturing the video.

9. The system of claim 8, wherein the processor is configured to transform the video into a rectilinear format.

10. The system of claim 1, wherein the coordinator is configured to embed metadata about the object into the video, and wherein the metadata comprises a timestamp and a coordinate location of the object in the still frame images.

11. The system of claim 1, wherein the coordinator is configured to generate a metadata stream corresponding to the image, wherein the metadata stream includes one or more timestamps corresponding to the image, and wherein the coordinator is configured to embed the metadata stream in the video.

* * * * *